(12) United States Patent
Iwase et al.

(10) Patent No.: US 11,335,322 B2
(45) Date of Patent: May 17, 2022

(54) LEARNING DEVICE, LEARNING METHOD, VOICE SYNTHESIS DEVICE, AND VOICE SYNTHESIS METHOD

(71) Applicant: SONY CORPORATION, Tokyo (JP)

(72) Inventors: Hiro Iwase, Kanagawa (JP); Mari Saito, Kanagawa (JP); Shinichi Kawano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 66 days.

(21) Appl. No.: 16/478,602

(22) PCT Filed: Feb. 27, 2018

(86) PCT No.: PCT/JP2018/007086
§ 371 (c)(1),
(2) Date: Jul. 17, 2019

(87) PCT Pub. No.: WO2018/168427
PCT Pub. Date: Sep. 20, 2018

(65) Prior Publication Data
US 2020/0051545 A1    Feb. 13, 2020

(30) Foreign Application Priority Data
Mar. 13, 2017  (JP) .............................. JP2017-047497

(51) Int. Cl.
*G10L 13/02* (2013.01)
*G10L 13/047* (2013.01)
(Continued)

(52) U.S. Cl.
CPC ............. *G10L 13/047* (2013.01); *G10L 15/16* (2013.01); *G10L 15/22* (2013.01); *G10L 15/25* (2013.01);
(Continued)

(58) Field of Classification Search
CPC ......... G10L 15/00; G10L 21/00; G10L 13/02; G10L 25/63; G10L 13/033; G06K 9/00248; G06T 1/0014
See application file for complete search history.

(56) References Cited

U.S. PATENT DOCUMENTS

| | | | |
|---|---|---|---|
| 8,527,276 B1 * | 9/2013 | Senior | G06N 3/084 704/259 |
| 2004/0054537 A1 * | 3/2004 | Morio | G10L 13/0335 704/260 |

(Continued)

FOREIGN PATENT DOCUMENTS

| | | |
|---|---|---|
| JP | 2003-271182 | 9/2003 |
| JP | 2009-042910 A | 2/2009 |

*Primary Examiner* — Feng-Tzer Tzeng
(74) *Attorney, Agent, or Firm* — Paratus Law Group, PLLC

(57) ABSTRACT

The present technology relates to a learning device, a learning method, a voice synthesis device, and a voice synthesis method configured so that information can be provided via voice allowing easy understanding of contents by a user as a speech destination. A learning device according to one embodiment of the present technology performs voice recognition of speech voice of a plurality of users, estimates statuses when a speech is made, and learns, on the basis of speech voice data, a voice recognition result, and the statuses when the speech is made, voice synthesis data to be used for generation of synthesized voice according to statuses upon voice synthesis. Moreover, a voice synthesis device estimates statuses, and uses the voice synthesis data to generate synthesized voice indicating the contents of predetermined text data and obtained according to the estimated statuses. The present technology can be applied to an agent device.

20 Claims, 29 Drawing Sheets

(51) Int. Cl.
*G10L 15/16* (2006.01)
*G10L 15/22* (2006.01)
*G10L 15/25* (2013.01)
*G10L 25/84* (2013.01)
*G06T 1/00* (2006.01)
*G10L 21/00* (2013.01)
*G10L 25/63* (2013.01)
*G10L 15/00* (2013.01)

(52) U.S. Cl.
CPC ............ *G10L 25/84* (2013.01); *G06T 1/0014* (2013.01); *G10L 13/02* (2013.01); *G10L 15/00* (2013.01); *G10L 21/00* (2013.01); *G10L 25/63* (2013.01)

(56) References Cited

U.S. PATENT DOCUMENTS

| | | | |
|---|---|---|---|
| 2004/0104702 A1* | 6/2004 | Nakadai | G06T 1/0014 318/568.12 |
| 2004/0193422 A1* | 9/2004 | Fado | G10L 13/033 704/260 |
| 2008/0235018 A1* | 9/2008 | Eggen | G10L 15/26 704/251 |
| 2009/0300041 A1 | 12/2009 | Schroeter | |
| 2015/0286858 A1* | 10/2015 | Shaburov | G06T 7/337 382/103 |
| 2016/0140951 A1 | 5/2016 | Agiomyrgiannakis et al. | |

\* cited by examiner

FIG. 10

| REQUEST/ INSTRUCTION USER ID / RECEIVING USER ID | A | B | C |
|---|---|---|---|
| A |  | 8 | −3 |
| B | (5) |  | 2 |
| C | −1 | −6 |  |

↑ USER RELATIONSHIP DATA #4

LEARNING DEVICE, LEARNING METHOD, VOICE SYNTHESIS DEVICE, AND VOICE SYNTHESIS METHOD

CROSS REFERENCE TO PRIOR APPLICATION

This application is a National Stage Patent Application of PCT International Patent Application No. PCT/JP2018/007086 (filed on Feb. 27, 2018) under 35 U.S.C. § 371, which claims priority to Japanese Patent Application No. 2017-047497 (filed on Mar. 13, 2017), which are all hereby incorporated by reference in their entirety.

TECHNICAL FIELD

The present technology relates to a learning device, a learning method, a voice synthesis device, and a voice synthesis method, and specifically relates to a learning device, a learning method, a voice synthesis device, and a voice synthesis method configured so that information can be provided via voice allowing easy understanding of contents by a user as a speech destination.

BACKGROUND ART

In recent years, a home agent device configured to provide various types of information via voice has become widely used. For example, various types of information such as a weather report, a schedule, and the contents of a received e-mail are provided as if the device talks to a user.

CITATION LIST

Patent Document

Patent Document 1: Japanese Patent Application Laid-open No. 2011-186143
Patent Document 2: Japanese Patent Application Laid-Open No. 2016-006541

SUMMARY OF THE INVENTION

Problems to be Solved by the Invention

A speech made by voice synthesis (text to speech (TTS)) incorporated into equipment has the same monotonous voice quality and tone every time. For this reason, a user does not build a familiarity, and turns less attention to the speech.

The present technology has been made in view of such a situation, and can provide information via voice allowing easy understanding of contents by a user as a speech destination.

Solutions to Problems

A learning device of one aspect of the present technology includes a voice recognition unit configured to perform voice recognition of speech voice of a plurality of users, an estimation unit configured to estimate statuses when a speech is made, and a learning unit configured to learn, on the basis of data of the speech voice, a result of the voice recognition, and the statuses when the speech is made, voice synthesis data to be used for generation of synthesized voice according to statuses upon voice synthesis.

The estimation unit can generate, on the basis of the voice recognition result, relationship data indicating a relationship between a speech user and a speech destination user included in the a plurality of users.

An image recognition unit configured to analyze a captured image to recognize a face on the image and a voice signal processing unit configured to detect a sound source direction on the basis of a voice signal detected when the speech is made can be further provided. In this case, the estimation unit can specify the speech user on the basis of the sound source direction and the direction of the face on the image.

The estimation unit can specify, as the speech destination user, a user making a speech subsequently to a speech made by the speech user.

The voice signal processing unit can extract, as a noise component, components of other directions than the sound source direction of speech voice of the speech user from the voice signal.

The image recognition unit can recognize the emotion of the speech user whose face is on the image.

The estimation unit can estimate, as the statuses when the speech is made, the emotion of the speech user and a noise level.

The learning unit can generate, as the voice synthesis data, dictionary data obtained in such a manner that each of the speech voice data and the voice recognition result is classified according to the statuses when the speech is made.

The learning unit can generate, as the voice synthesis data, a neural network taking information regarding each of the voice recognition result and the statuses when the speech is made as input and taking the speech voice data as output.

A voice synthesis device of another aspect of the present technology includes an estimation unit configured to estimate statuses, and a generation unit configured to use voice synthesis data generated by learning on the basis of data on speech voice of a plurality of users, a voice recognition result of the speech voice, and statuses when a speech is made to generate synthesized voice indicating the contents of predetermined text data and obtained according to the estimated statuses.

The generation unit can generate the synthesized voice taking, as a speaker user, a user according to a speech destination user of the synthesized voice.

A control unit configured to select the speech user on the basis of relationship data indicating a relationship between a speech user and a speech destination user included in the plurality of users can be further provided, the relationship data being generated upon learning on the basis of the voice recognition result.

The control unit can select the speech destination user on the basis of the contents of the text data.

An image recognition unit configured to analyze a captured image to recognize a face on the image and a voice signal processing unit configured to detect a sound source direction on the basis of a detected voice signal to extract, as a noise component, components of other directions than the sound source direction of speech voice of a predetermined user can be further provided.

The estimation unit can specify the emotion of the speaker user on the basis of the contents of the text data to estimate the emotion of the speaker user and a noise level as the statuses.

The voice synthesis data can be dictionary data obtained in such a manner that each of the speech voice data and the voice recognition result is classified according to the statuses when the speech is made.

The voice synthesis data can be a neural network taking information regarding each of the voice recognition result and the statuses when the speech is made as input and taking the speech voice data as output.

In one aspect of the present technology, voice recognition of speech voice of a plurality of users is performed, statuses when a speech is made are estimated, and voice synthesis data to be used for generation of synthesized voice according to statuses upon voice synthesis are learnt on the basis of speech voice data, a voice recognition result, and the statuses when the speech is made.

In another aspect of the present technology, statuses are estimated, and voice synthesis data generated by learning on the basis of data on speech voice of a plurality of users, a voice recognition result of the speech voice, and statuses when a speech is made are used to generate synthesized voice indicating the contents of predetermined text data and obtained according to the estimated statuses.

Effects of the Invention

According to the present technology, information can be provided via voice allowing easy understanding of contents by a user as a speech destination.

Note that the advantageous effects described herein are not limited, and may be any of the advantageous effects described in the present disclosure.

BRIEF DESCRIPTION OF DRAWINGS

FIG. 10 is a table of an example of user relationship data.

MODE FOR CARRYING OUT THE INVENTION

Hereinafter, a mode for carrying out the present technology will be described. Description will be made in the following order:
1. Outline of Learning and Voice Synthesis;
2. First Embodiment (Example Using Voice Synthesis Dictionary); and
3. Second Embodiment (Example Using Voice Synthesis Network).

Outline of Learning and Voice Synthesis

Figure 1:
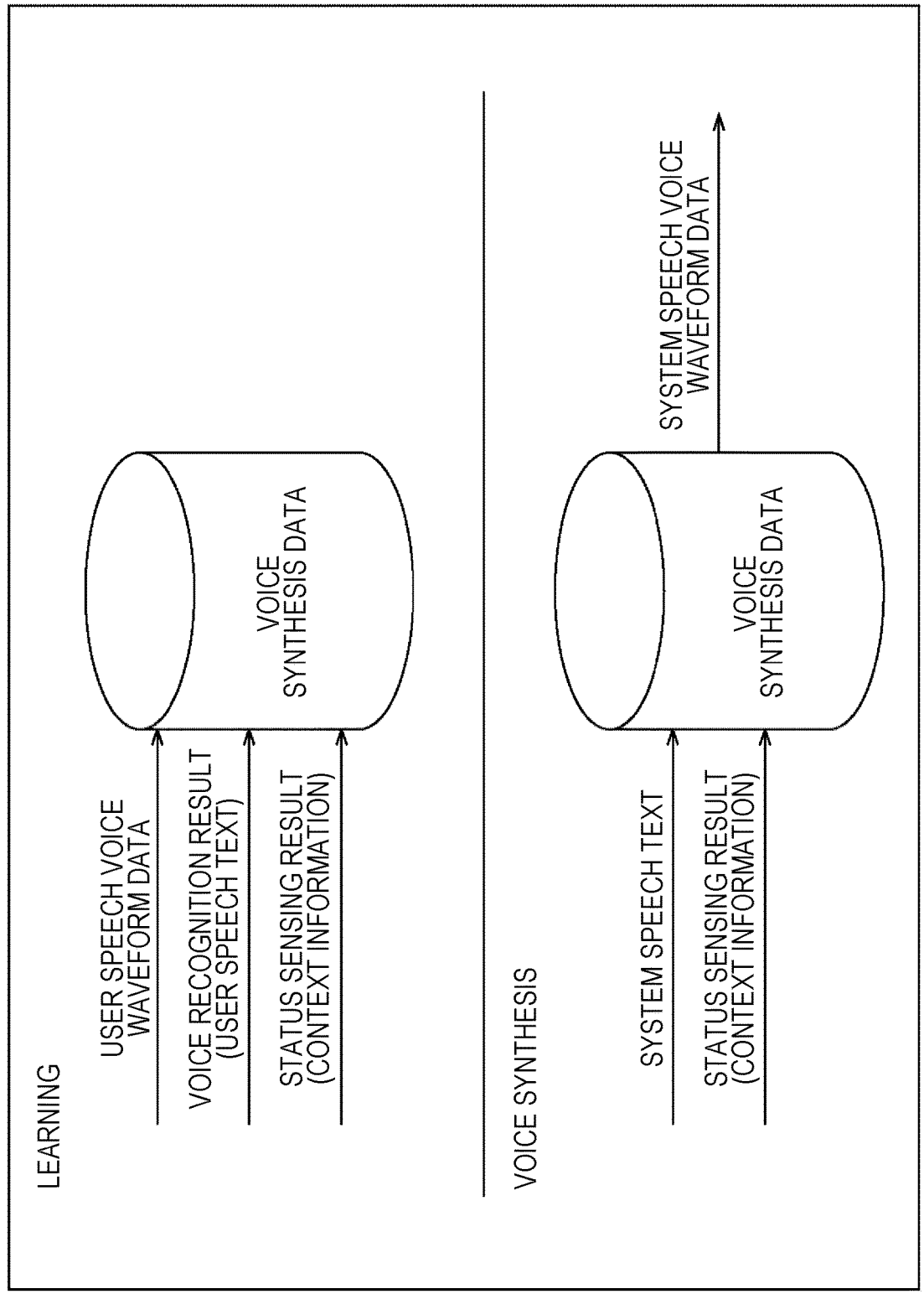
FIG. 1 is a diagram of the outline of voice synthesis data learning and voice synthesis.

FIG. 1 is a diagram of the outline of learning of voice synthesis data and voice synthesis using the voice synthesis data.

A learning device and a voice synthesis device according to one embodiment of the present technology are mainly devices used under environment where a plurality of limited users is present on a daily basis, such as a home. Hereinafter, a case where the learning device and the voice synthesis device are used in a house in which the total of three users including parents and a single child live will be described.

Note that the learning device and the voice synthesis device are not provided as separate devices, but can be provided as a single device as described later.

The learning device detects speech voice obtained by a daily family conversation or speech voice emitted from a family to the learning device, and on the basis of the detected speech voice, learns voice synthesis data for generating voice resembling the voice of each user by voice synthesis. When the voice is defined by a voice quality and a tone, voice resembling the voice of a certain user is voice whose voice quality and tone resemble those of the voice of the user.

By learning on the basis of the speech voice of the family, each of voice synthesis data for generating the voice of the father, voice synthesis data for generating the voice of the mother, and voice synthesis data for generating the voice of the child is generated.

As described later, in the voice synthesis device, text to speech (TTS) is performed using the voice synthesis data generated by the learning device, and the contents of predetermined text are provided as the voice of someone from the family.

As illustrated on an upper side of FIG. 1, learning of the voice synthesis data is performed using not only user speech voice waveform data as data on the speech voice and user speech text obtained by voice recognition of the speech voice but also context information indicating a status sensing result when a speech is made.

For example, the user making the speech, the emotion of the user making the speech, noise when the speech is made, and the user as a speech destination are detected as statuses when the speech is made, and these types of information are used for learning.

The voice synthesis data generated as described above is provided to the voice synthesis device via wired or wireless communication or a recording medium.

On the other hand, as illustrated on a lower side of FIG. 1, voice synthesis using the voice synthesis data is performed using, as input, system speech text as text indicating contents provided as synthesized voice and context information indicating a status sensing result upon voice synthesis. System speech voice waveform data as synthesized voice data according to the system speech text and the context information is output (generated) with reference to the voice synthesis data.

As described above, learning of the voice synthesis data in the learning device and voice synthesis in the voice synthesis device are performed considering the statuses at each timing.

Normally, person's speech voice has different voice qualities and tones according to, e.g., a speech target, an emotion when a speech is made, and noise.

Learning is performed considering the above-described statuses so that the voice synthesis data for obtaining voice according to each status by voice synthesis can be generated. Moreover, voice synthesis is performed using the voice synthesis data generated in this manner so that the voice according to each status can be generated.

Hereinafter, an example of the case of using a voice synthesis dictionary as the voice synthesis data and an example of the case of using a voice synthesis network including a neural network will be described.

First Embodiment (Example Using Voice Synthesis Dictionary

Figure 2:
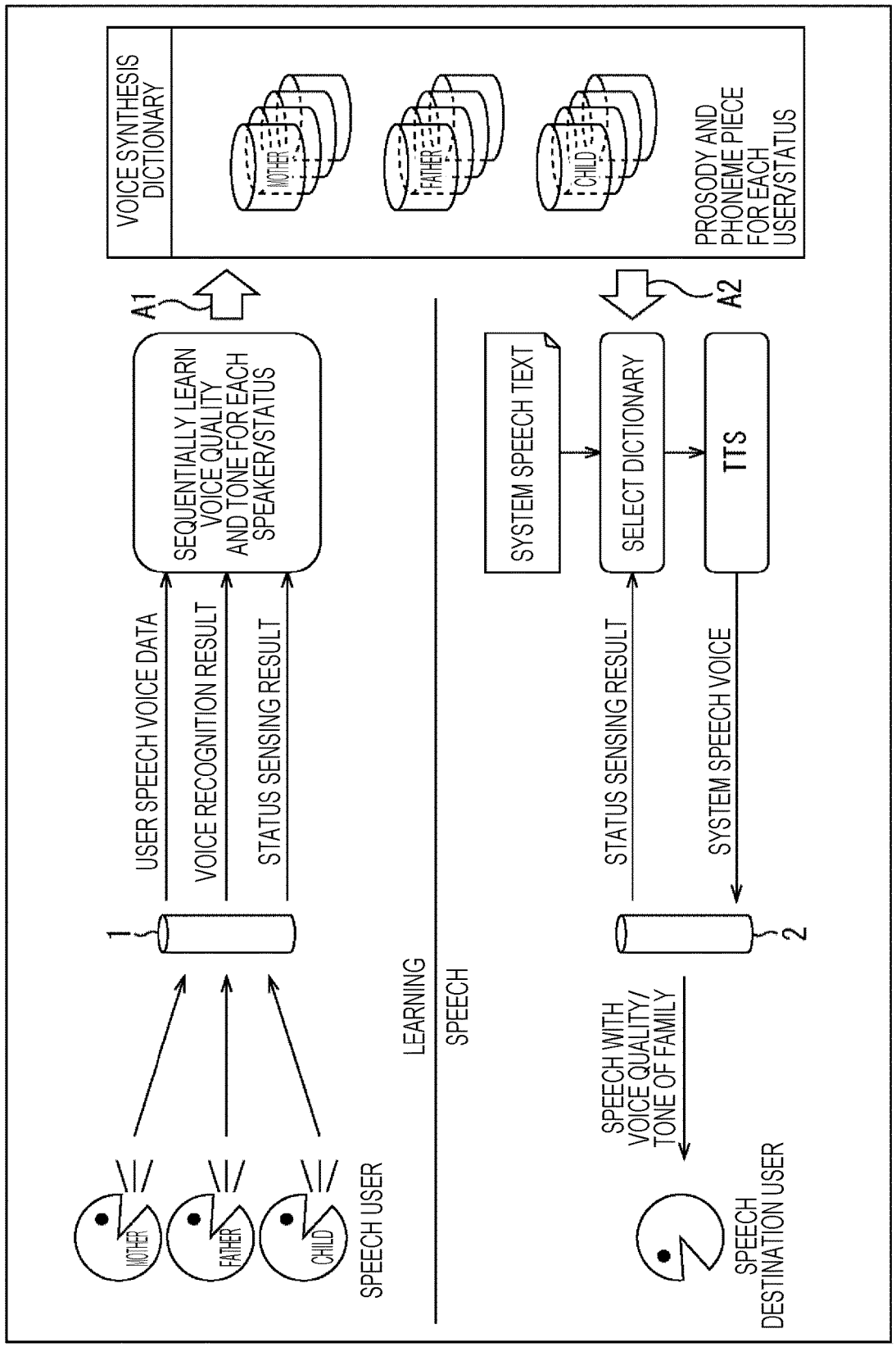
FIG. 2 is a diagram of an example of the flow of voice synthesis dictionary learning and voice synthesis.

FIG. 2 is a diagram of an example of the flow of learning and voice synthesis in the case of using a voice synthesis dictionary as voice synthesis data.

As illustrated on an upper side of FIG. 2, a learning device 1 detects speech voice of each member of a family as a speech user, and sequentially automatically learn the voice synthesis dictionary by means of user speech voice waveform data and user speech text as a voice recognition result. Hereinafter, the voice synthesis dictionary will be merely referred to as a "dictionary" as necessary.

Upon learning, the learning device 1 described herein uses a sensing result obtained by sensing of surrounding statuses to specify which member of the family is the speech user, and for each user, generates dictionaries for voice with different voice qualities and tones. Moreover, the learning device 1 uses the sensing result to detect the statuses such as a speech user's emotion, noise, and a speech destination, and for each status, generates dictionaries for voice with different voice qualities and tones.

Accordingly, as pointed by a white arrow A1 of FIG. 1, a plurality of dictionaries storing data on prosody and a phoneme piece of voice of each user in each status is generated as the voice synthesis dictionaries. The data on the prosody and the phoneme piece is associated with the user speech text. The prosody is an element forming the tone, such as intonation, rhythm, and pause.

Such learning is sequentially performed every time the user makes a speech, and therefore, the dictionaries according to various emotions, various types of noise, and various speech destinations for each user are generated.

On the other hand, as illustrated on a lower side of FIG. 2, in a case where a system speech is made for a predetermined user of the family as the speech destination, a voice synthesis device 2 selects a predetermined user of the family as a speaker. For example, the speaker is selected on the basis of the contents of system speech text and the surrounding statuses such that the speaker of the voice with the voice quality and the tone expected as most-easily expressable contents for the user as the speech destination is selected. For example, other users of the family than the user as the speech destination are selected as the speakers.

The surrounding statuses are specified on the basis of the sensing result. Note that the system speech means output of synthesized voice from the voice synthesis device 2. The system speech text is text data indicating contents to be given in notification to the user by the system speech.

Moreover, the voice synthesis device 2 selects, as pointed by a white arrow A2, the voice synthesis dictionary for the selected speaker according to the contents of the system speech text and the surrounding statuses, and performs voice synthesis of the system speech text. The voice synthesis device 2 outputs system speech voice obtained by voice synthesis, thereby providing notification of the contents of the system speech text via the synthesized voice with the voice quality and the tone according to the user as the speech destination and the surrounding statuses.

As described later in detail, it is assumed that the contents of the system speech text are an instruction for a child, for example. In this case, the user as the speech destination is the "child", and when the child does not usually (at the point of learning) listen to a mother, but listens to a father, the speaker is the "father". Moreover, the dictionary according to the contents of the system speech text and the statuses is selected from the "father's" voice synthesis dictionaries generated by learning using the speech voice of the "father", and voice synthesis is performed.

Details of the flow of learning by the learning device 1 and the flow of voice synthesis by the voice synthesis device 2 as described above will be described later with reference to flowcharts.

Learning of Voice Synthesis Dictionary

Configuration Example of Learning Device

Figure 3:
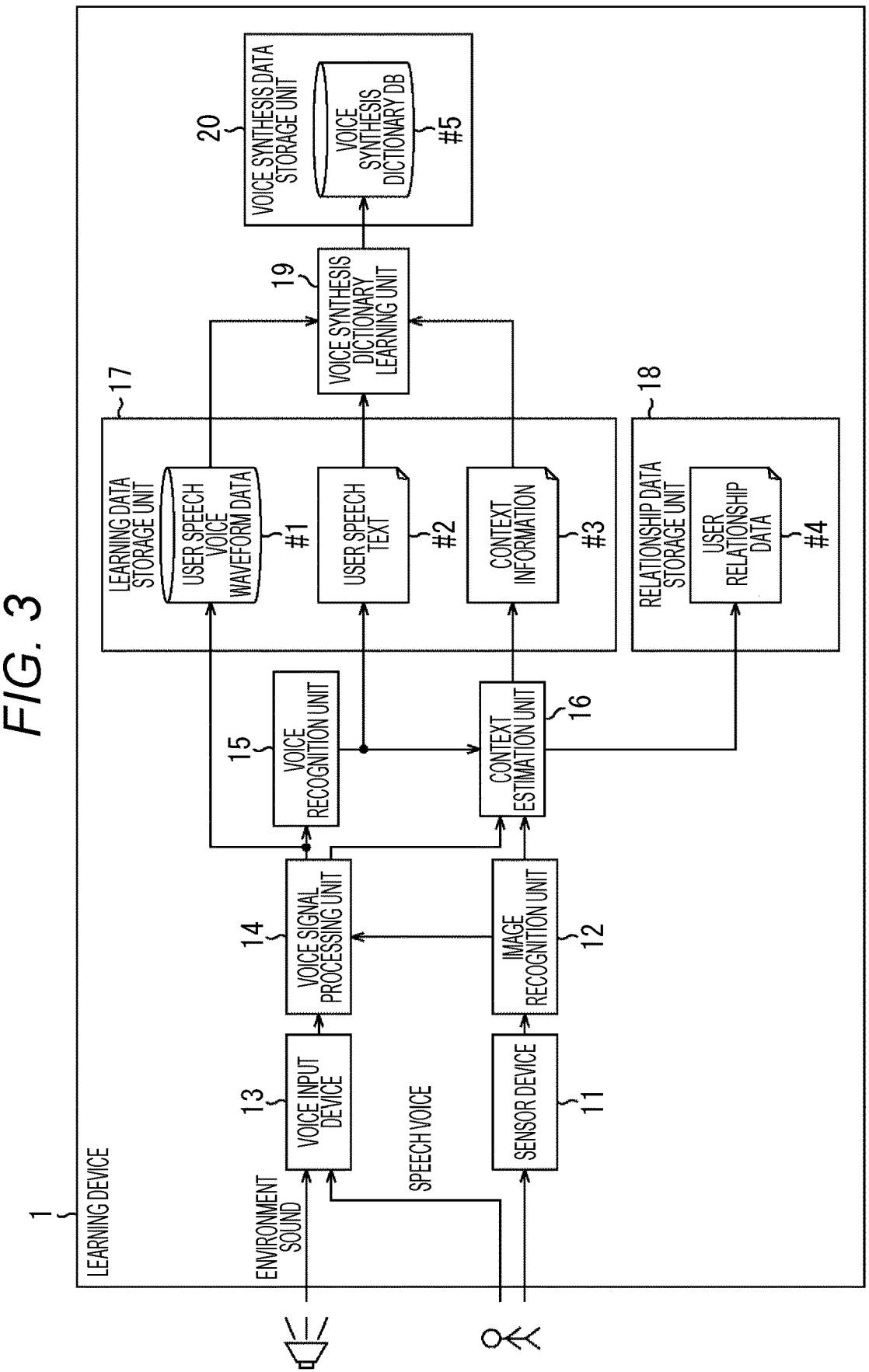
FIG. 3 is a block diagram of a configuration example of a learning device.

FIG. 3 is a block diagram of a configuration example of the learning device 1.

The learning device 1 includes a sensor device 11, an image recognition unit 12, a voice input device 13, a voice signal processing unit 14, a voice recognition unit 15, a context estimation unit 16, a learning data storage unit 17, a relationship data storage unit 18, a voice synthesis dictionary learning unit 19, and a voice synthesis data storage unit 20.

The sensor device 11 includes a camera. An image captured by the sensor device 11 is supplied to the image recognition unit 12.

The image recognition unit 12 performs facial recognition, and detects the face of the user on the captured image. Moreover, the image recognition unit 12 analyzes the captured image to identify the user, and estimates the emotion on the basis of facial expression of the user.

The image recognition unit 12 generates the following information as information regarding the user for which the face has been detected.

User Direction

Information calculated from the position of the face on the image and indicating the direction of the user as viewed from the learning device 1.

Individual Identification Information (User ID)

Information used for identification of the user. In an example at home, information indicating any of the father, the mother, and the child.

Emotion

Information indicating the estimated emotion, such as calm, joy, sadness, or anger.

In a case where a plurality of users is on the captured image (in a case where a plurality of faces has been detected), the image recognition unit 12 generates the above-described information for each user.

The image recognition unit 12 outputs the direction information and the individual identification information regarding each user to the voice signal processing unit 14. Moreover, the image recognition unit 12 outputs, to the context estimation unit 16, the information indicating the direction, the individual identification information, and the emotion of each user.

The voice input device 13 includes a plurality of microphones (a microphone array). The voice input device 13 detects the voice emitted from the user around the learning device 1 and environment sound. A signal of the voice detected by the voice input device 13 is supplied as an input voice signal to the voice signal processing unit 14.

The voice signal processing unit 14 performs sound source separation processing for the input voice signals of the plurality of microphones, and specifies, as a sound source direction, the same direction as the user direction indicated by the information supplied from the image recognition unit 12. The voice signal processing unit 14 extracts a voice signal of a component of the specified sound source direction.

Moreover, the voice signal processing unit 14 performs voice activity detection processing for the extracted voice signal, and detects a voice signal in an activity in which the user is making a speech. The voice activity signal detected by the voice signal processing unit 14 is supplied to the voice recognition unit 15 and the learning data storage unit 17, and is stored as user speech voice waveform data #1.

Separation of the sound source direction is disclosed in Reference Literature 1, for example. Moreover, voice activity detection is disclosed in Reference Literature 2, for example.

Reference Literature 1 "URL http://www.ieice-hbkb.org/files/02/02gun_06hen_02.pdf"

Reference Literature 2 "URL https://julius.osdn.jp/julius-book/ja/desc_vad.html"

Note that in a case where a plurality of users is recognized by the image recognition unit 12, the voice signal processing unit 14 performs the sound source separation processing and the voice activity detection processing for each user direction, and calculates a score for each voice activity. A speech-ness score as a score indicating human speech-ness is calculated herein. The voice signal processing unit 14 detects, as the voice signal of the speech voice, the voice signal with the highest speech-ness score, i.e., the voice signal in the most human speech-ness direction.

Meanwhile, in addition to the voice signal obtained by the user's speech, a voice signal of the environment sound is also input to the voice signal processing unit 14. The voice signal processing unit 14 takes, as noise, sound of a direction component other than the direction for which the speech voice (the user's speech voice) has been detected by the voice activity detection processing, and obtains a noise amount.

For example, the noise amount is obtained in such a manner that the voice signal of the direction component (a non-speech direction component) other than the direction for which the speech voice has been detected is extracted by the sound source separation processing and the root-mean-square (RMS/an effective value) of the voice signal (an amplitude value) of the non-speech direction component in a speech voice time interval is calculated.

The voice signal processing unit 14 outputs, to the context estimation unit 16, the information indicating the noise amount and the user speech direction.

The voice recognition unit 15 performs voice recognition for the voice signal of the speech voice supplied from the voice signal processing unit 14, and generates the user speech text. The user speech text generated by the voice recognition unit 15 is supplied to the context estimation unit 16 and the learning data storage unit 17, and is stored as user speech text #2.

The following information is input from each block to the context estimation unit 16. The number of users detected herein by the image recognition unit 12 is assumed as n.

From the image recognition unit 12, a set (an image recognition result set) of the user direction, the individual identification information, and the emotion×n users are input.

From the voice signal processing unit 14, a set of the user speech direction and the noise amount is input.

From the voice recognition unit 15, the user speech text is input.

Figure 4:
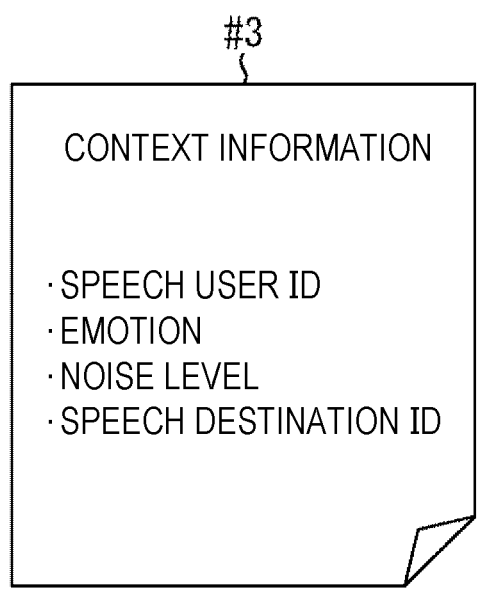
FIG. 4 is a diagram of an example of context information.

The context estimation unit 16 generates context information #3 on the basis of the above-described input information. The context information #3 is information associated with the user speech voice waveform data and the user speech text. As illustrated in FIG. 4, the context information #3 includes the following information.

Speech User ID

Individual identification information regarding the image recognition result set whose user direction is coincident with the user speech direction among the n image recognition result sets.

Emotion

Emotion (e.g., calm, joy, sadness, or anger) of the image recognition result set whose user direction is coincident with the user speech direction among the n image recognition result sets.

Noise Level

Level obtained in such a manner that the noise amount supplied from the voice signal processing unit 14 is classified into three levels of high, middle, and low by threshold processing.

Speech Destination ID

Individual identification information regarding the user as the speech destination when the user for which the speech is made is determined from time continuity of the speech between the users.

For example, in a case where the speech with a speech user ID of "child" is detected right after the speech with a speech user ID of "mother" has been detected (within certain time), the speech destination ID for the speech with the speech user ID of "mother" is "child". When no speech other than the speech of the mother is made within the certain time, such as when the mother makes a speech to the learning device 1, the speech destination ID is set as "none".

As described above, the context estimation unit 16 functions as an estimation unit configured to estimate the statuses when the speech is made.

Moreover, the context estimation unit 16 determines, on the basis of the speech user ID associated with the user speech text, which user provides a request or an instruction and which user receives such a request or instruction. The context estimation unit 16 generates, as user relationship data #4, information indicated by a score for each user regarding the degree of user's acceptance of the user's request or instruction. The context estimation unit 16 outputs the user relationship data #4 to the relationship data storage unit 18 to store the user relationship data #4.

For example, a case where the speech user is the "mother" and a speech of "go to bed now" meaning an instruction is made will be described. In a case where the "child" as the speech user makes a speech of "yes" meaning agreement right after the speech of "go to bed now", addition is made for an acceptance score of the "child" as a receiving user for the "mother" as a request/instruction user.

Conversely, in a case where the "child" as the speech user makes a speech of "no" meaning refusal right after the speech of "go to bed now", subtraction is made for the acceptance score of the "child" as the receiving user for the "mother" as the request/instruction user.

The learning data storage unit 17 stores a learning data set associated with the user speech voice waveform data #1, the user speech text #2, and the context information #3. The learning data set is accumulated in every detection of the speech.

The voice synthesis dictionary learning unit 19 learns the dictionary every time the learning data set increases by a certain amount, i.e., every time a certain number of speeches is made. Learning of the dictionary is performed by background processing, for example. The dictionary generated by learning by the voice synthesis dictionary learning unit 19 is supplied to the voice synthesis data storage unit 20, and is stored. A voice synthesis dictionary DB #5 as a dictionary database is formed in the voice synthesis data storage unit 20.

Operation of Learning Device

Learning processing of the learning device 1 having the above-described configuration will be described with reference to a flowchart of FIG. 5.

At step S1, the voice input device 13 detects the voice. The input voice signal including the user's speech voice and the environment sound is supplied to the voice signal processing unit 14.

At step S2, the sensor device 11 captures the image. The image captured by imaging is supplied to the image recognition unit 12.

At step S3, the image recognition unit 12 analyzes the image to detect the face of the user on the image and identify the user. Moreover, the image recognition unit 12 estimates the emotion on the basis of the facial expression of the user. The direction information and the individual identification information regarding each user are supplied to the voice signal processing unit 14, and the direction information, the individual identification information, and the emotion information regarding each user are supplied as the image recognition result set to the context estimation unit 16.

At step S4, the voice signal processing unit 14 performs speech detection/noise amount calculation processing. Details of the speech detection/noise amount calculation processing will be described later with reference to a flowchart of FIG. 6.

At step S5, the voice recognition unit 15 performs voice recognition for the voice signal supplied from the voice signal processing unit 14, and generates the user speech text. The user speech text is supplied to the learning data storage unit 17, and is stored.

At step S6, the context estimation unit 16 performs context information generation processing. Details of the context information generation processing will be described later with reference to a flowchart of FIG. 8.

At step S7, the context estimation unit 16 performs user relationship determination processing. Details of the user relationship determination processing will be described later with reference to a flowchart of FIG. 9.

At step S8, the voice synthesis dictionary learning unit 19 performs voice synthesis dictionary generation processing. Details of the voice synthesis dictionary generation processing will be described later with reference to a flowchart of FIG. 11.

After the dictionary generated by the voice synthesis dictionary generation processing has been stored in the voice synthesis data storage unit 20, a series of learning processing ends. The above-described processing is repeatedly performed at predetermined timing such as the timing of making a speech by the user.

Speech Detection/Noise Amount Calculation Processing

Next, the speech detection/noise amount calculation processing performed at step S4 of FIG. 5 will be described with reference to the flowchart of FIG. 6.

Figure 7:
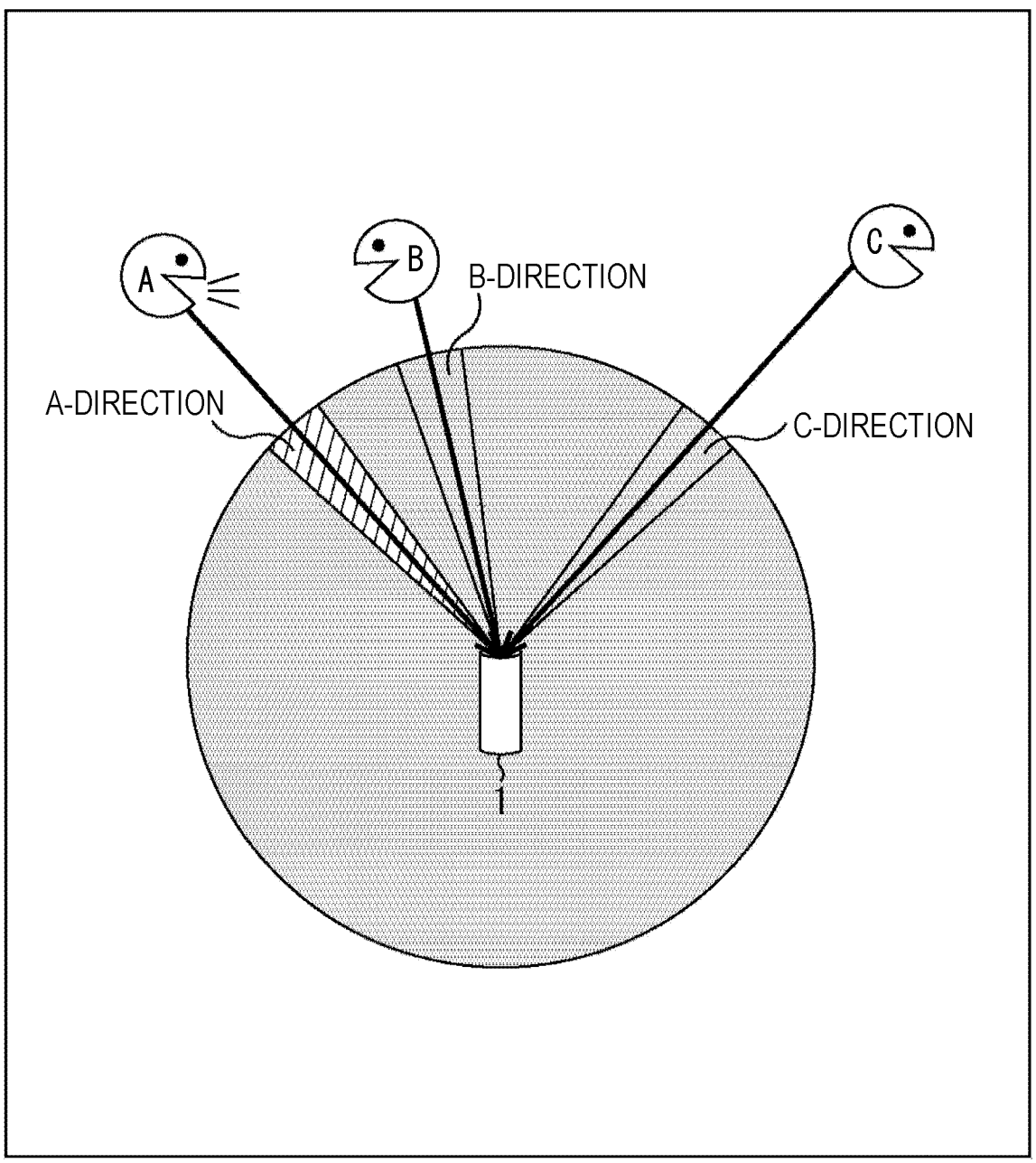
FIG. 7 is a view of an example of users around the learning device.

It is assumed herein that users A, B, and C are present around the learning device 1 and the user A makes a speech as illustrated in FIG. 7. The users A, B, and C are the father, the mother, and the child, respectively.

At step S21, the voice signal processing unit 14 acquires the direction information and the individual identification information regarding the users A, B, and C recognized by the image recognition unit 12.

At step S22, the voice signal processing unit 14 performs the sound source separation processing for the input voice signal supplied from the voice input device 13, and extracts the voice signal of each direction component of the users A, B, and C.

At step S23, the voice signal processing unit 14 performs the voice activity detection processing for the extracted voice signal, and calculates the speech-ness score for the voice signal of each direction component of the users A, B, and C.

For example, in a case where characteristics of the speech voice are exhibited and there is a high probability that the input voice signal is the signal of the speech voice, a high score is assigned as the speech-ness score. Moreover, in a case where, e.g., the same sound is continued and there is a low probability that the input voice signal is the signal of the speech voice, a low score is assigned as the speech-ness score.

At step S24, the voice signal processing unit 14 outputs the voice signal with the highest speech-ness score, such as the voice signal of the direction component of the user A, among the voice signals of the direction components of the users A, B, and C. The voice signal output from the voice signal processing unit 14 is supplied to the voice recognition unit 15 and the learning data storage unit 17, and is stored as the user speech voice waveform data.

At step S25, the voice signal processing unit 14 takes, as noise components, other direction components than the direction component of the user A in speech activity (time) of the user A, and calculates the noise amount. In FIG. 7, the components of the voice signals in other directions (portions indicated by a light color) than the direction of the user A indicated by a hatched portion are processed as the noise components.

The information indicating the noise amount and the user speech direction calculated as described above is supplied to the context estimation unit 16. Thereafter, the processing returns to step S4 of FIG. 5 to perform processing at step S4 and subsequent steps.

Context Information Generation Processing

Figure 8:
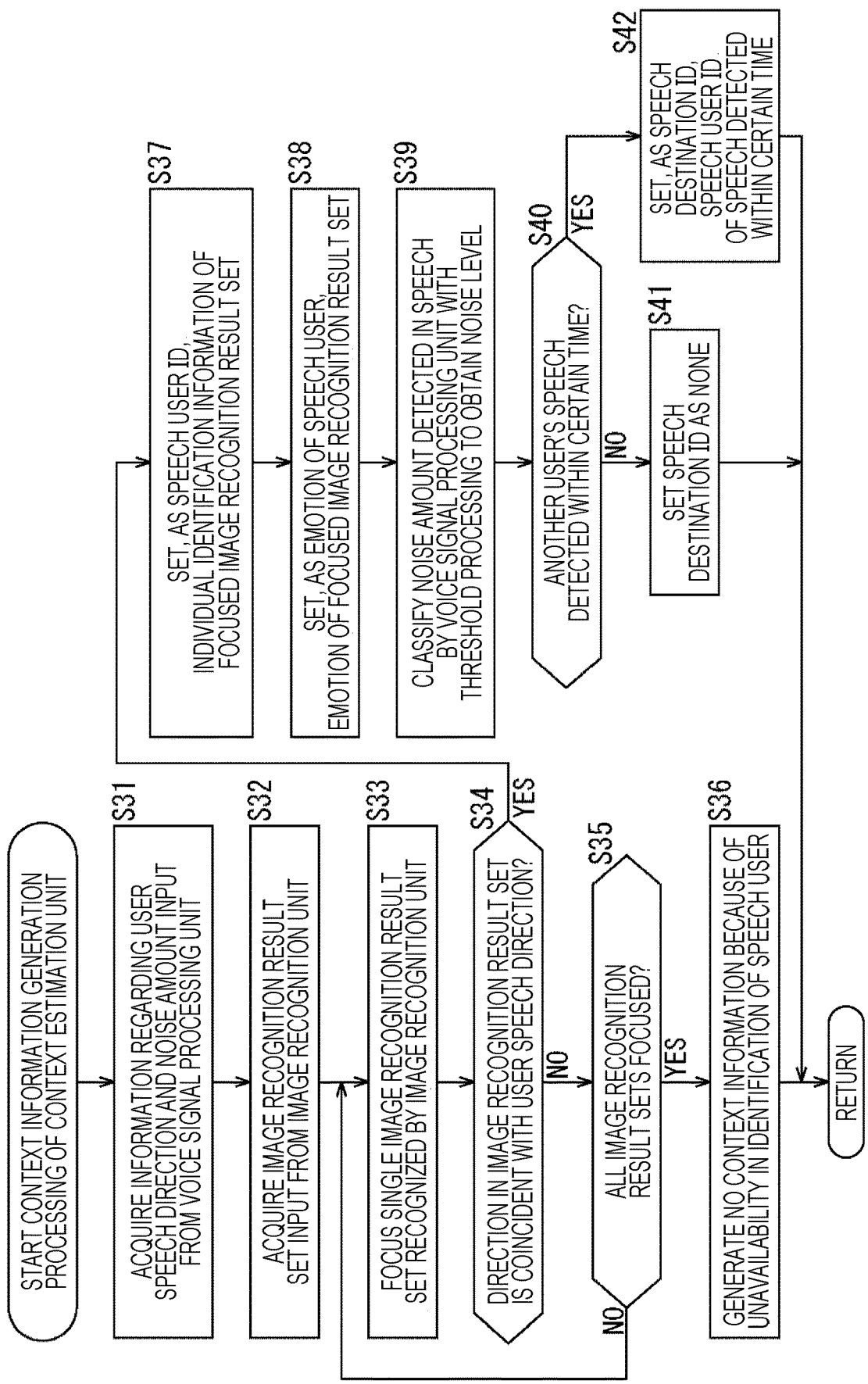
FIG. 8 is a flowchart for describing context information generation processing performed at step S6 of FIG. 5.

Next, the context information generation processing performed at step S6 of FIG. 5 will be described with reference to the flowchart of FIG. 8.

At step S31, the context estimation unit 16 acquires the user speech direction information and the noise amount information input from the voice signal processing unit 14.

At step S32, the context estimation unit 16 acquires the image recognition result set supplied from the image recognition unit 12. The image recognition result set includes the direction information, the individual identification information, and the emotion information regarding each user recognized by image analysis.

At step S33, the context estimation unit 16 focuses on a single image recognition result set.

At step S34, the context estimation unit 16 determines whether or not the user direction indicated by the information included in the focused image recognition result set is coincident with the user speech direction detected by the voice signal processing unit 14.

In a case where it is, at step S34, determined that the user direction indicated by the information included in the focused image recognition result set is not coincident with the user speech direction, the context estimation unit 16 determines, at step S35, whether or not all image recognition result sets have been focused.

In a case where it is, at step S35, determined that all image recognition result sets are not focused yet, the context estimation unit 16 returns to step S33, and focuses on a subsequent image recognition result set to continue similar processing.

In a case where it is, at step S35, determined that all accumulated image recognition result sets have been focused, the context estimation unit 16 cannot specify the speech user at step S36, and therefore, does not generate the context information and ends the processing. In this case, no speech has been made. Thereafter, the processing returns to step S6 of FIG. 5, and subsequent processing is performed.

At step S34, in a case where it is determined that the user direction indicated by the information included in the focused image recognition result set is coincident with the user speech direction, the processing proceeds to step S37. In this case, the user present in the direction coincident with the speech direction is specified as the speech user.

At step S37, the context estimation unit 16 sets, as the speech user ID, the individual identification information included in the focused image recognition result set.

At step S38, the context estimation unit 16 sets, as the emotion of the speech user, the emotion indicated by the information included in the focused image recognition result set.

At step S39, the context estimation unit 16 classifies the noise amount detected in the speech by the voice signal processing unit 14 by means of a threshold, and obtains the noise level. For example, in a case where three levels of high, middle, and low are set as the noise level, the context estimation unit 16 classifies the noise amount in the speech as any of the levels by comparison with the threshold.

At step S40, the context estimation unit 16 determines whether or not the speech by another user has been detected within the certain time.

In a case where it is, at step S40, determined that no speech by another user has been detected within the certain time, the context estimation unit 16 sets, at step S41, the speech destination ID as none.

On the other hand, in a case where it is, at step S40, determined that the speech by another user has been detected within the certain time, the context estimation unit 16 sets the speech user ID of such speech as the speech destination ID at step S42.

That is, the currently-focused image recognition result set corresponds to the speech by a predetermined user. In a case where there is an image recognition result set which corresponds to the speech detected within the certain time after the speech of the predetermined user and for which another user has been specified as the speech user, the individual identification information regarding such another user is set as the speech destination ID.

Figure 5:
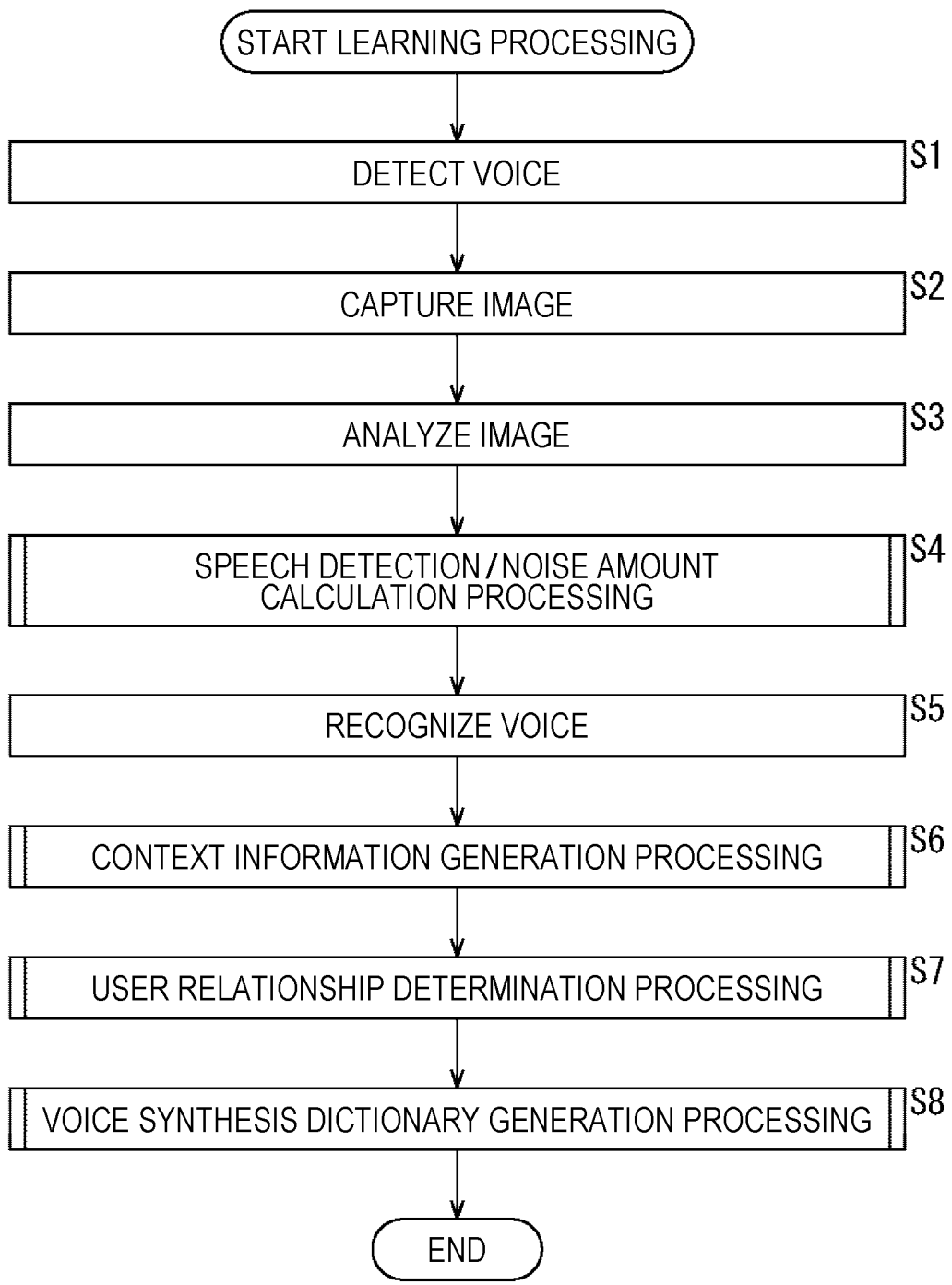
FIG. 5 is a flowchart for describing learning processing of the learning device.
Figure 6:
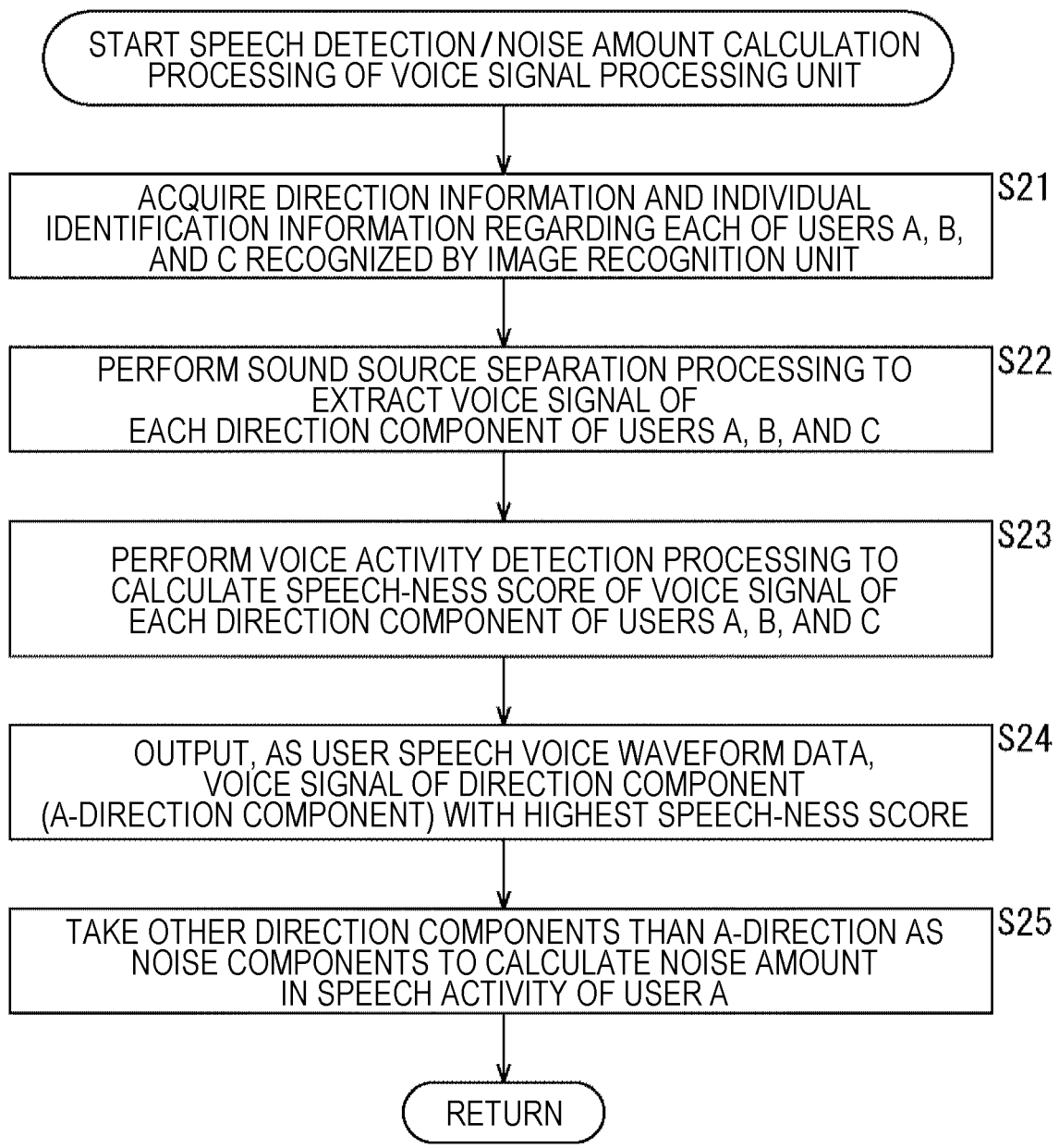
FIG. 6 is a flowchart for describing speech detection/noise amount calculation processing performed at step S4 of FIG. 5.

In a case where the speech destination ID is set as none at step S41 or a case where the speech destination ID is set at step S42, the processing returns to step S6 of FIG. 5, and subsequent processing is performed.

By the above-described processing, the context information indicating the statuses in each speech is generated for such a speech. The context information generated by the context information generation processing is supplied to the learning data storage unit 17, and is stored.

User Relationship Determination Processing

Figure 9:
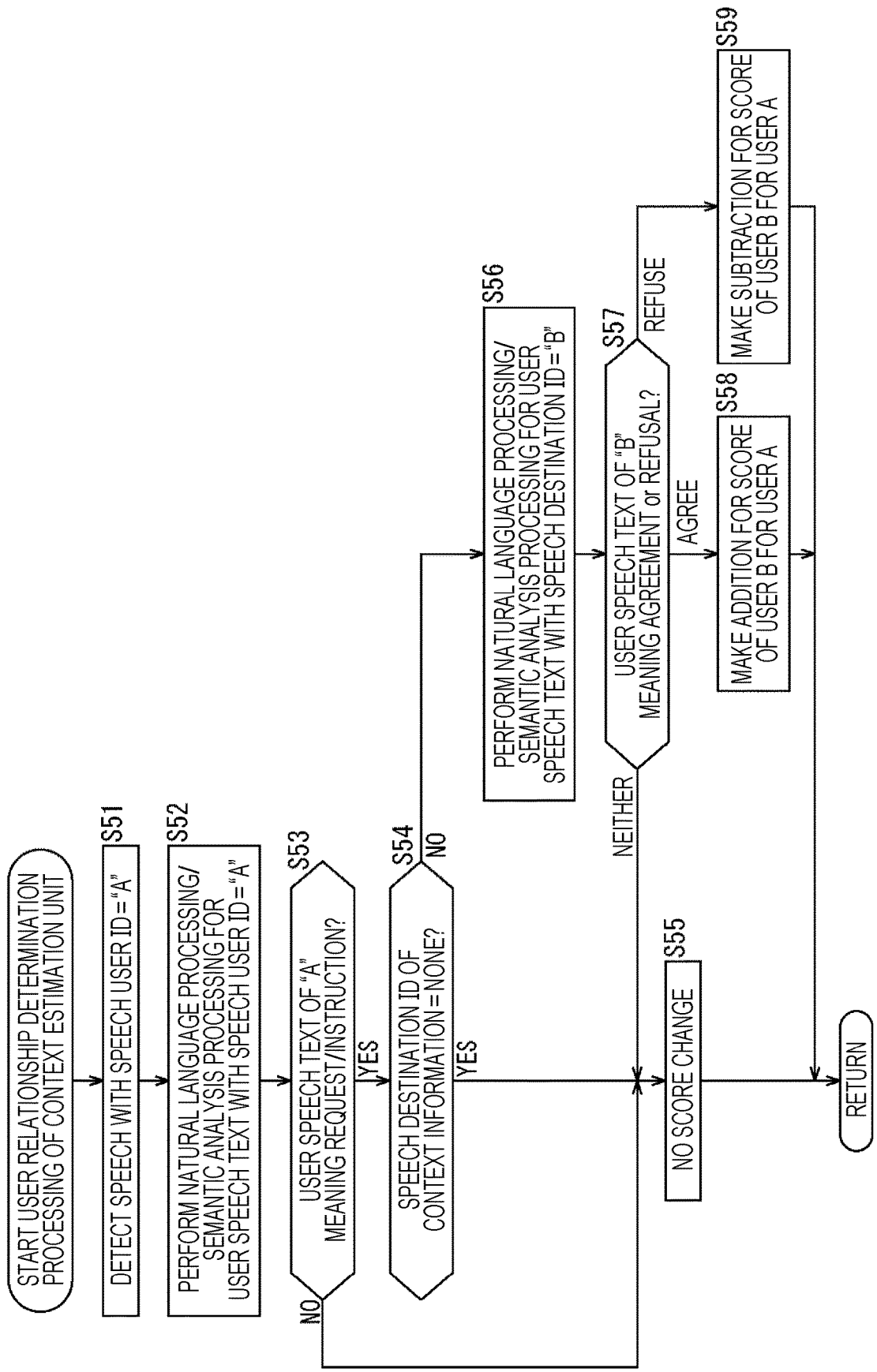
FIG. 9 is a flowchart for describing user relationship determination processing performed at step S7 of FIG. 5.

Next, the user relationship determination processing performed at step S7 of FIG. 5 will be described with reference to the flowchart of FIG. 9.

It is assumed herein that the speech of the user A of FIG. 7 has been detected. In this case, the context information for which the individual identification information ("A") on the user A has been set as the speech user ID is generated by the processing described with reference to FIG. 8.

At step S51, the context estimation unit 16 detects the speech with the speech user ID="A".

At step S52, the context estimation unit 16 performs natural language processing and semantic analysis processing for the user speech text with the speech user ID="A". In a case where the speech with the speech user ID="A" has been detected, the voice recognition unit 15 supplies the user speech text as the voice recognition result of such a speech.

At step S53, the context estimation unit 16 determines whether or not the user speech text with the speech user ID="A" means a request or an instruction for other users. By the natural language processing and the semantic analysis processing, the user speech text is classified according to the meaning thereof.

In a case where it is, at step S53, determined that the user speech text with the speech user ID="A" means the request or the instruction for other users, the processing proceeds to step S54.

At step S54, the context estimation unit 16 determines, with reference to the context information corresponding to the speech with the speech user ID="A", whether or not the speech destination ID has been set as none.

In a case where it is, at step S54, determined that the speech destination ID has been set as none, the context estimation unit 16 ends the processing without changing the acceptance score at step S55. Similarly, in a case where it is, at the step S53, determined that the user speech text with the speech user ID="A" does not mean the request or the instruction for other users, the processing ends without a change in the acceptance score. Thereafter, the processing returns to step S7 of FIG. 5, and subsequent processing is performed.

On the other hand, in a case where it is, at step S54, determined that the speech destination ID is not set as none, i.e., the individual identification information regarding the predetermined user has been set as the speech destination ID, the processing proceeds to step S56.

In this case, the speech with the speech user ID="A" is the speech with contents for requesting or giving an instruction on something for the mother or the child as other users. It is assumed herein that the speech with the speech user ID="A" is the speech with a request or instruction for the mother as the user B, and in response, the mother makes some kinds of a response speech. The response speech with the speech user ID="B" is also detected, and voice recognition processing and context information generation are performed.

At step S56, the context estimation unit 16 performs the natural language processing and the semantic analysis processing for the user speech text with the speech user ID="B". In a case where the response speech with the speech user ID="B" has been detected, the voice recognition unit 15 supplies the user speech text as the voice recognition result of such a speech.

At step S57, the context estimation unit 16 determines whether or not the user speech text with the speech user ID="B" means agreement or refusal.

In a case where it is, at step S57, determined that the user speech text with the speech user ID="B" means agreement, the context estimation unit 16 makes, at step S58, addition for the acceptance score of the user B for the user A.

On the other hand, in a case where it is, at step S57, determined that the user speech text with the speech user ID="B" means refusal, the context estimation unit 16 makes, at step S59, subtraction for the acceptance score of the user B for the user A.

After the acceptance score has been updated at step S58 or step S59, the processing ends, and processing after step S7 of FIG. 5 is performed. In a case where it is, at step S57, determined that the user speech text with the speech user ID="B" means neither agreement nor refusal, the processing proceeds to step S55, and ends without a change in the acceptance score.

FIG. 10 is a table of an example of the user relationship data.

A, B, and C on the uppermost line indicate the individual identification information regarding the user providing the request or the instruction, and A, B, and C on the left end column indicate the individual identification information regarding the user receiving the request or the instruction. Each number indicates the acceptance score obtained in the above-described manner.

In a case where the user A makes, as described above, the speech with the contents for requesting or giving an instruction on something for the user B and the user B makes the response of agreement or refusal, the acceptance score surrounded by a circle changes.

In an example of FIG. 10, the acceptance score indicating that the request or instruction of the user A is more likely to be accepted by the user B, but is less likely to be accepted by the user C is obtained. The acceptance score of the user B for the user A is five, and the acceptance score of the user C for the user A is −1.

As described above, the user relationship data is information including the scores indicating the degree of acceptance of a request or instruction of a certain user by each of other users. The user relationship data generated by the user relationship determination processing is supplied to the relationship data storage unit 18, and is stored.

In this example, the user relationship data is illustrated as information in the form of a table, but information in any form may be employed as long as such information includes an association among the user providing the request or the instruction, the user receiving the request or the instruction, and the acceptance score. A neural network can be used as the user relationship data.

Voice Synthesis Dictionary Generation Processing

Figure 11:
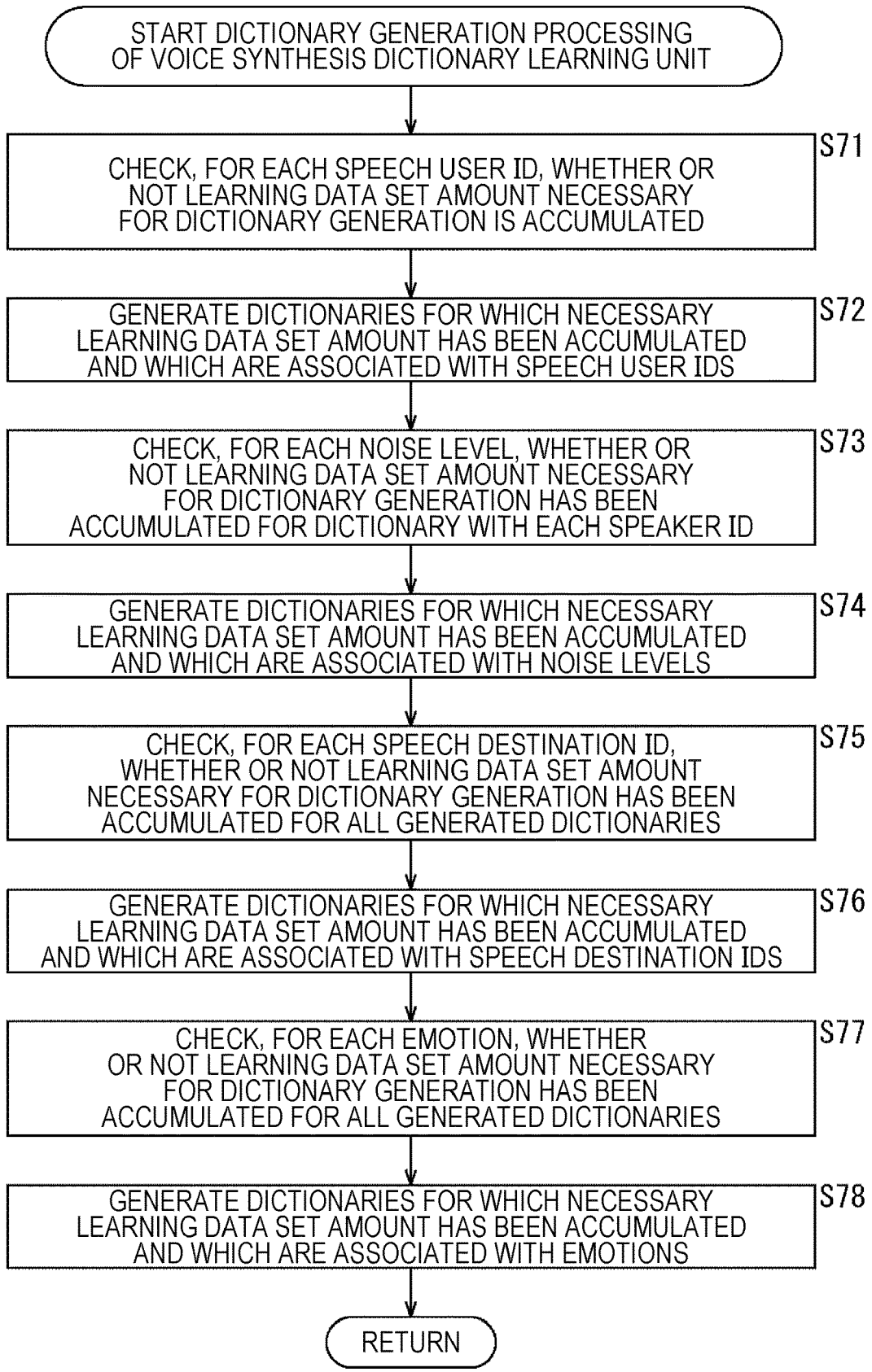
FIG. 11 is a flowchart for describing voice synthesis dictionary generation processing performed at step S8 of FIG. 5.

Next, the voice synthesis dictionary generation processing performed at step S8 of FIG. 5 will be described with reference to the flowchart of FIG. 11.

Figure 12:
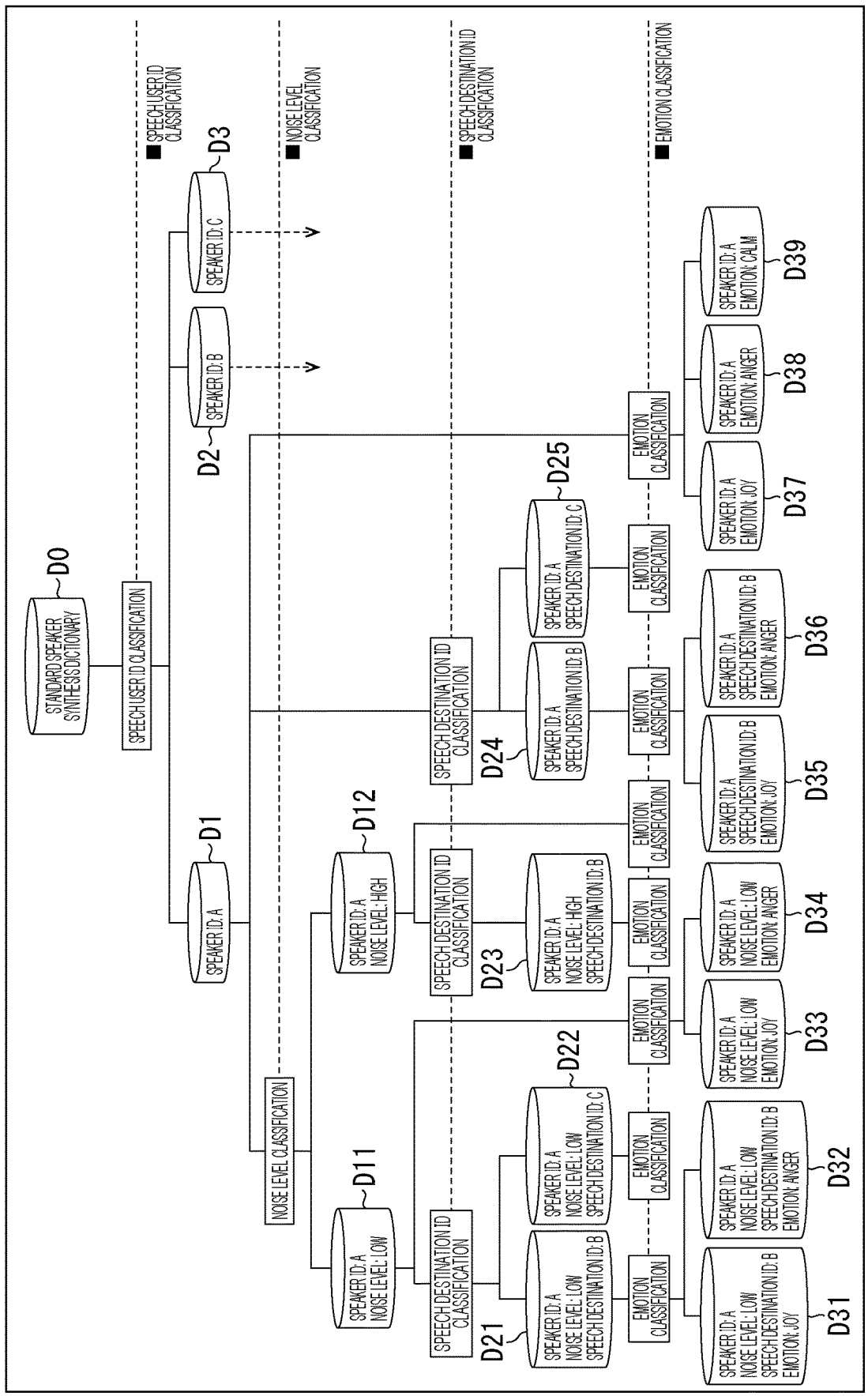
FIG. 12 is a diagram of an example of dictionary generation in the voice synthesis dictionary generation processing.

As illustrated in FIG. 12, the voice synthesis dictionary generation processing is performed in such a manner that the learning data set corresponding to each speech is classified according to each type of information including the speech user ID, the noise level, the speech destination ID, and the emotion of the context information. The learning data storage unit 17 stores, as the learning data set, the user speech voice waveform data, the user speech text, and the context information.

In an initial state in which no user's speech has been learnt, only a standard speaker synthesis dictionary D0 illustrated on the uppermost line of FIG. 12 is present. The system speech in the initial state is performed by voice synthesis using the standard speaker synthesis dictionary D0.

At step S71, the voice synthesis dictionary learning unit 19 checks, for each speech user ID, whether or not a learning data set amount necessary for generation of the dictionary has been accumulated. Checking at this point is performed with reference to the context information forming each learning data set.

At step S72, the voice synthesis dictionary learning unit 19 generates the dictionaries for which the learning data set amount necessary for generation of the dictionary has been accumulated and which are associated with the speech user IDs. The dictionary for a certain speech user ID is generated using a learning data set group including such a speech user ID as the context information.

In an example of FIG. 12, a necessary amount of learning data set has been accumulated for the speech user IDs="A", "B", and "C", and dictionaries D1 to D3 with the speaker IDs="A", "B", and "C" are generated. Hereinafter, only generation of the dictionary belonging to the dictionary D1 with the speaker ID="A" will be described, but generation of the dictionaries belonging to the dictionary D2 with the speaker ID="B" and the dictionary D3 with the speaker ID="C" is similarly performed.

At step S73, the voice synthesis dictionary learning unit 19 checks, for each noise level, whether or not the learning data set amount necessary for generation of the dictionary has been accumulated for the dictionaries generated with all speaker IDs at step S72.

At step S74, the voice synthesis dictionary learning unit 19 generates the dictionaries for which the learning data set amount necessary for generation of the dictionary has been accumulated and which are associated with the noise levels.

In the example of FIG. 12, a necessary amount of learning data set with a low noise level and a necessary amount of learning data set with a high noise level are accumulated in the learning data set group user for generation of the dictionary D1 with the speaker ID="A". A dictionary D11 with the speaker ID="A" and the noise level="low" and a dictionary D12 with the speaker ID="A" and the noise level="high" are generated.

The dictionary D11 is a dictionary generated using a learning data set group including both of the speech user ID="A" and the noise level="low" as the context information. Moreover, the dictionary D12 is a dictionary generated using a learning data set group including both of the speech user ID="A" and the noise level="high" as the context information.

At step S75, the voice synthesis dictionary learning unit 19 checks, for each speech destination ID, whether or not the learning data set amount necessary for generation of the dictionary has been accumulated for all dictionaries generated before step S74.

At step S76, the voice synthesis dictionary learning unit 19 generates the dictionaries for which the learning data set amount necessary for generation of the dictionary has been accumulated and which are associated with the speech destination IDs.

In the example of FIG. 12, three dictionaries including the dictionary D1 with the speaker ID="A", the dictionary D11 with the speaker ID="A" and the noise level="low", and the dictionary D12 with the speaker ID="A" and the noise level="high" are generated by the processing before step S74.

Moreover, in the example of FIG. 12, classification with the speech destination ID is performed for the learning data set group used for generation of each of these three dictionaries by performing the classification according to the speech destination ID, and therefore, new five dictionaries D21 to D25 are generated.

For example, the dictionary D21 is a dictionary generated using a learning data set group including the speech user ID="A", the noise level="low", and the speech destination ID="B" as the context information. Moreover, the dictionary D25 is a dictionary generated using a learning data set group including the speech user ID="A" and the speech destination ID="C" as the context information.

At step S77, the voice synthesis dictionary learning unit 19 checks, for each emotion, whether or not the learning data set amount necessary for generation of the dictionary has been accumulated for all dictionaries generated before step S76.

At step S78, the voice synthesis dictionary learning unit 19 generates the dictionaries for which the learning data set amount necessary for generation of the dictionary has been accumulated and which are associated with the emotions.

In the example of FIG. 12, eight dictionaries including the dictionary D1 generated by classification according to the speech user ID, the dictionaries D11 and D12 generated by classification according to the noise level, and the dictionaries D21 to D25 generated by classification according to the speech destination ID are generated before step S76.

Moreover, in the example of FIG. 12, classification according to the emotion is performed for the learning data set group used for generation of each of the above-described eight dictionaries, and new nine dictionaries D31 to D39 are generated.

For example, the dictionary D31 is a dictionary generated using a learning data set group including the speech user ID="A", the noise level="low", the speech destination ID="B", and the emotion="joy" as the context information. Moreover, the dictionary D39 is a dictionary generated using a learning data set group including the speech user ID="A" and the emotion="calm" as the context information.

After the dictionaries have been generated by classification according to the emotion, the processing ends. Thereafter, the processing returns to step S8 of FIG. 5, and subsequent processing is performed. The dictionaries generated by the voice synthesis dictionary generation processing are sequentially supplied to the voice synthesis data storage unit 20, and are stored.

The above-described processing is performed every time the learning data set increases by a certain amount (every time a certain number of user speeches are made). Accordingly, as the user uses the learning device 1 and the speeches increase, the quality of each dictionary (the degree of similarity to an actual speech) gradually increases, and the number of dictionaries according to the type of the context information, i.e., speech variations, increase.

The case where the learning data set is classified according to the speech user ID, the noise level, the speech destination ID, and the emotion to generate the dictionary has been described above, but more status types may be used as the statuses used for classification. In this case, the context information including information regarding much more status types is generated.

Note that the method for generating the voice synthesis dictionary from a user speech text group corresponding to the user speech voice waveform data in the learning data set is, for example, disclosed in the following reference literatures:

Reference Literature 3 "Japanese Patent Application Laid-Open No. 2016-006541"

Reference Literature 4 "URL https://www.nii.ac.jp/user-data/shimin/documents/H 27/150729_1stlec.pdf"

Reference Literature 5 "URL http://www.toshiba.co.jp/tech/review/2013/09/68_0 9pdf/a04.pdf"

Voice Synthesis Using Voice Synthesis Dictionary

Configuration Example of Voice Synthesis Device

Figure 13:
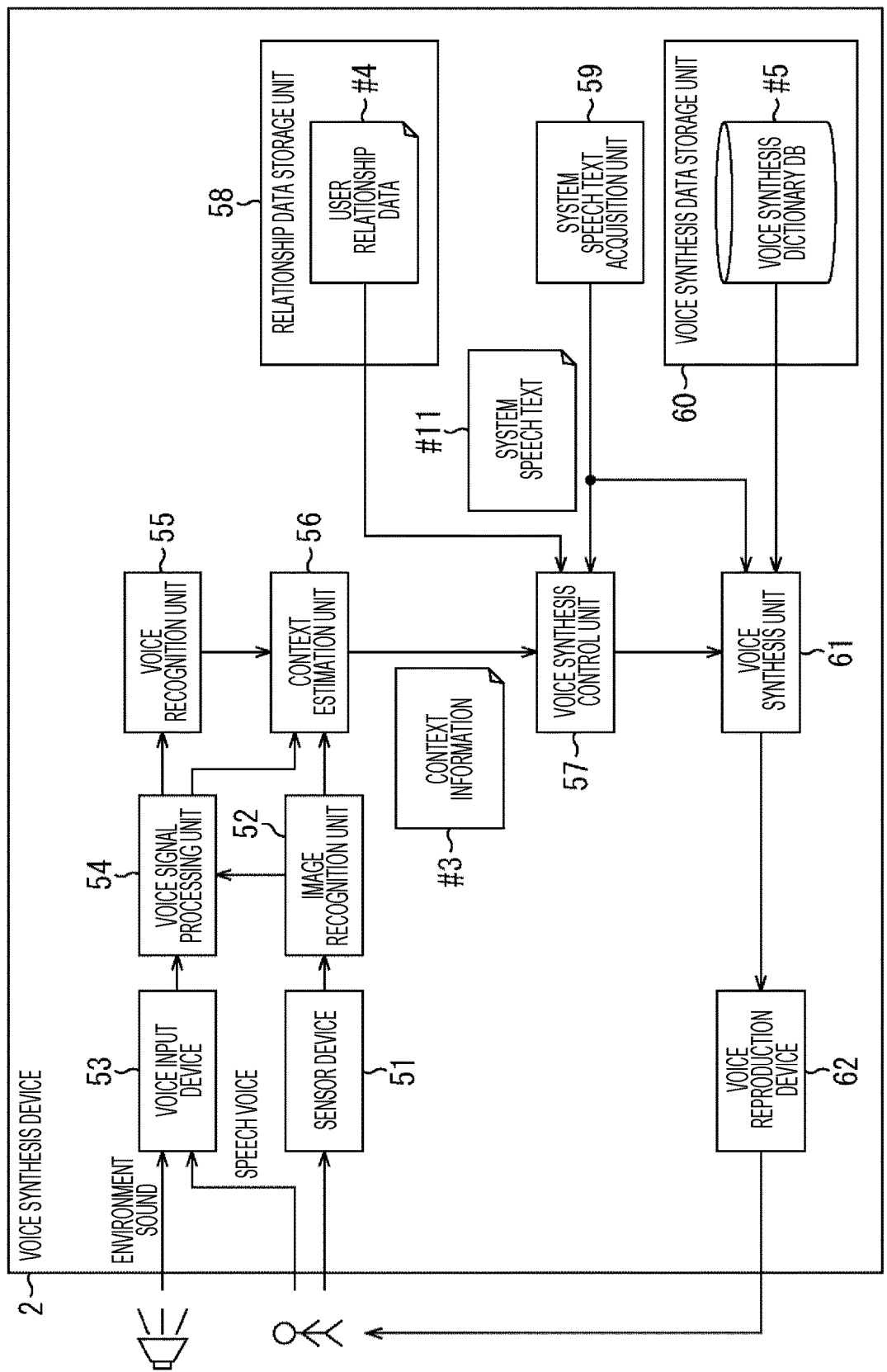
FIG. 13 is a block diagram of a configuration example of a voice synthesis device.

FIG. 13 is a block diagram of a configuration example of the voice synthesis device 2.

The voice synthesis device 2 includes a sensor device 51, an image recognition unit 52, a voice input device 53, a voice signal processing unit 54, a voice recognition unit 55, a context estimation unit 56, a voice synthesis control unit 57, a relationship data storage unit 58, a system speech text acquisition unit 59, a voice synthesis data storage unit 60, a voice synthesis unit 61, and a voice reproduction device 62.

Of the configurations of the voice synthesis device 2 illustrated in FIG. 13, the sensor device 51, the image recognition unit 52, the voice input device 53, the voice signal processing unit 54, the voice recognition unit 55, and the context estimation unit 56 correspond to the sensor device 11, the image recognition unit 12, the voice input device 13, the voice signal processing unit 14, the voice recognition unit 15, and the context estimation unit 16, respectively, of the learning device 1, and basically have similar functions. Overlapping description will be omitted as necessary.

The user relationship data #4 generated by the learning device 1 is stored in the relationship data storage unit 58, and the voice synthesis dictionary DB #5 is stored in the voice synthesis data storage unit 60.

The sensor device 51 repeatedly performs imaging, and outputs an image captured by imaging to the image recognition unit 52.

The image recognition unit 52 performs facial recognition, and detects the face of the user on the captured image.

Moreover, in a case where the face is on the image, the image recognition unit 52 analyzes the captured image to identify the user and estimate the emotion on the basis of the facial expression of the user. The image recognition unit 52 detects the user present therearound.

The image recognition unit 52 outputs the direction information and the individual identification information regarding each user to the voice signal processing unit 54. Moreover, the image recognition unit 52 outputs, to the context estimation unit 56, the information indicating the direction, the individual identification information, and the emotion of each user.

The voice input device 53 detects sound around the voice synthesis device 2, and outputs the input voice signal to the voice signal processing unit 54. In a case where the user is making a speech, the user's speech voice is detected together with the environment sound.

The voice signal processing unit 54 performs the sound source separation processing for the input voice signals from the plurality of microphones, and extracts the voice signal taking, as the sound source direction, the same direction as the user direction indicated by the information supplied from the image recognition unit 52.

Moreover, the voice signal processing unit 54 performs the voice activity detection processing for the extracted voice signal to detect the voice signal in the activity in which the user is making a speech and obtain the noise amount. The voice signal processing unit 54 outputs, to the voice recognition unit 55, the voice signal obtained in the activity in which the user is making a speech, and outputs the information indicating the noise amount and the user speech direction to the context estimation unit 56.

The voice recognition unit 55 performs voice recognition for the signal of the speech voice supplied from the voice signal processing unit 54 to generate the user speech text, and outputs the user speech text, to the context, estimation unit 56.

The context, estimation unit 56 generates the context information #3 on the basis of the information supplied from each unit, and outputs the context information #3 to the voice synthesis control unit 57. The context information #3 includes the speech user ID, the emotion, the noise level, and the speech destination ID. The context information #3 generated by the context estimation unit 56 is information indicating the surrounding statuses when the system speech is made.

The context information #3, the user relationship data #4 stored in the relationship data storage unit 58, and system speech text #11 acquired by the system speech text acquisition unit 59 are input to the voice synthesis control unit 57.

The voice synthesis control unit 57 selects the dictionary to be used for the system speech from the dictionaries in the voice synthesis dictionary DB #5 on the basis of an analysis result of the context information #3, the user relationship data #4, and the system speech text #11. The voice synthesis control unit 57 outputs, to the voice synthesis unit 61, information specifying the selected dictionary, and causes the voice synthesis unit 61 to perform voice synthesis.

The system speech text acquisition unit 59 acquires the system speech text, and outputs the system speech text to the voice synthesis control unit 57 and the voice synthesis unit 61. The system speech text is text data included in various types of information such as a message, a preregistered schedule, and information regarding the Internet.

The system speech text acquisition unit 59 acquires the information generated by the voice synthesis device 2 itself and the information input to the voice synthesis device 2 by the user. Moreover, the system speech text acquisition unit 59 acquires various types of information given in notification by system voice, such as information stored in a mobile terminal carried by the user, information stored in equipment at home, and information stored in a server on the Internet.

The voice synthesis unit 61 performs voice synthesis of the system speech text by means of the voice synthesis dictionary selected by the voice synthesis control unit 57, The voice synthesis unit 61 outputs, to the voice reproduction device 62, the system speech voice waveform data obtained by voice synthesis. The voice synthesis unit 61 functions as a generation unit configured to generate the synthesized voice indicating the contexts of the system speech text and corresponding to, e.g., the statuses when the system speech is made.

The voice reproduction device 62 includes a speaker. The voice reproduction device 62 reproduces the system speech voice waveform data generated by the voice synthesis unit 61, and outputs the system speech voice.

Operation of Voice Synthesis Device

Voice synthesis processing of the voice synthesis device 2 having the above-described configuration will be described with reference to a flowchart of FIG. 14.

Figure 14:
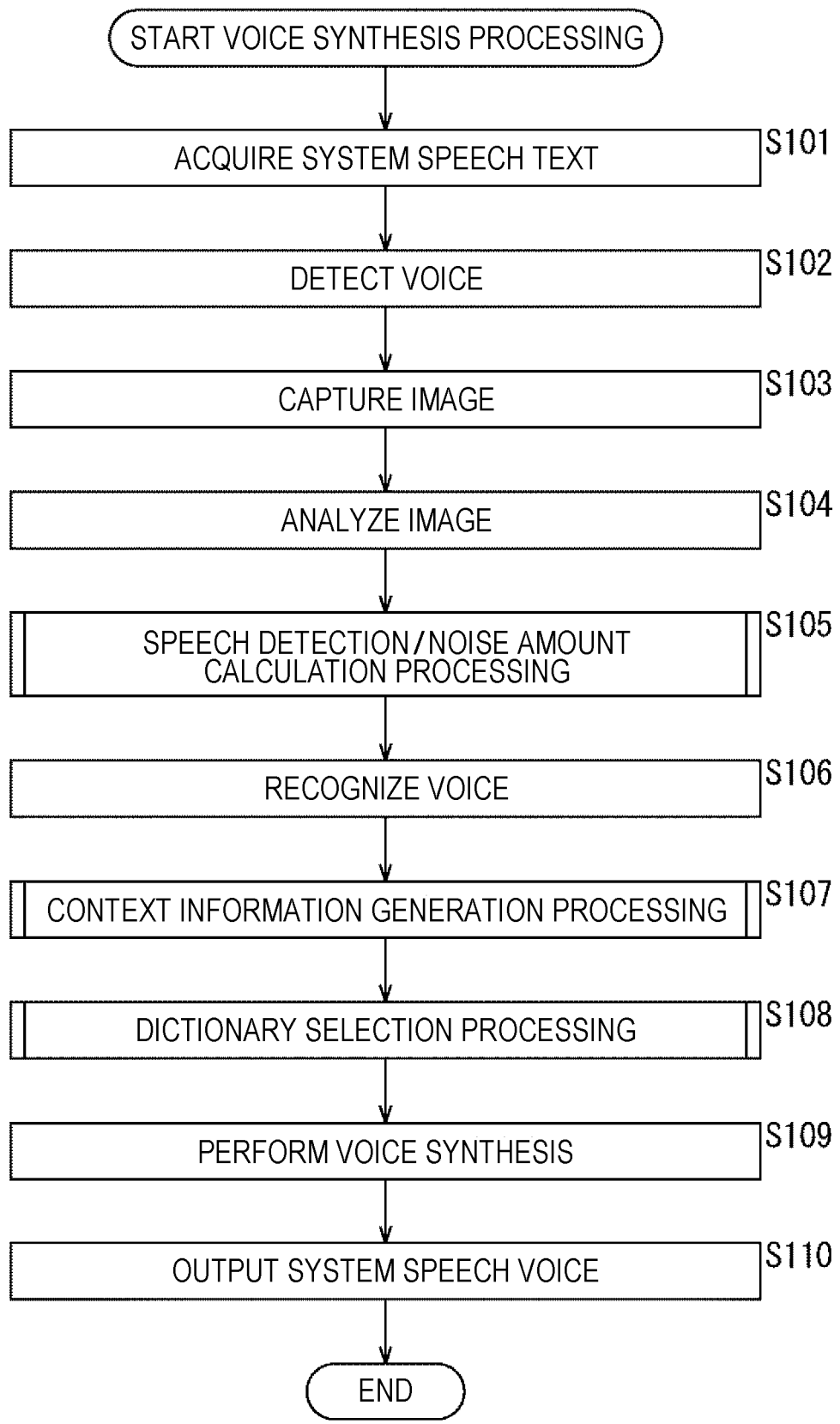
FIG. 14 is a flowchart for describing voice synthesis processing of the voice synthesis device.

Processing of steps S102 to S107 illustrated in FIG. 14 is processing basically similar to the processing of steps S1 to S6 of FIG. 5. Overlapping description will be omitted as necessary.

At step S101, the system speech text acquisition unit 59 acquires the system speech text. The system speech text is supplied to the voice synthesis control unit 57 and the voice synthesis unit 61.

At step S102, the voice input device 53 detects the voice.

At step S103, the sensor device 51 performs imaging.

At step S104, the image recognition unit 52 analyzes the captured image to detect the face of the user on the image and identify the user. Moreover, the image recognition unit 52 estimates the emotion of the user. The direction information and the individual identification information regarding each user are supplied to the voice signal processing unit 54, and the direction information, the individual identification information, and the emotion information regarding each user are supplied to the context estimation unit 56.

At step S105, the voice signal processing unit 54 performs the speech detection/noise amount calculation processing. The voice signal obtained by the speech detection/noise amount calculation processing is supplied to the voice recognition unit 55, and the information indicating the noise amount and the user speech direction is supplied to the context estimation unit 56.

At step S106, the voice recognition unit 55 performs voice recognition for the voice signal supplied from the voice signal processing unit 54, and generates the user speech text. The user speech text is supplied to the context estimation unit 56.

At step S107, the context estimation unit 56 performs the context information generation processing. The context information generated by the context information generation processing is supplied to the voice synthesis control unit 57.

At step S108, the voice synthesis control unit 57 performs dictionary selection processing. Details of the dictionary selection processing will be described later with reference to a flowchart of FIG. 15.

At step S109, the voice synthesis unit 61 performs voice synthesis of the system speech text by means of the dictionary selected by the voice synthesis control unit 57, and outputs the system speech voice waveform data to the voice reproduction device 62.

At step S110, the voice reproduction device 62 reproduces the system speech voice waveform data generated by the voice synthesis unit 61, and outputs the system speech voice. Thereafter, the processing ends.

The above-described processing is performed at every timing of making the system speech, for example.

Dictionary Selection Processing

Next, the dictionary selection processing performed at step S108 of FIG. 14 will be described with reference to a flowchart of FIG. 15.

At step S121, the voice synthesis control unit 57 performs the natural language processing and the semantic analysis processing, and analyzes the system speech text.

At step S122, the voice synthesis control unit 57 determines (determines the user as the speaker) the speaker ID to be used for the system speech. Determination on the speaker ID is, for example, performed using the contents of the context information, the contents of the system speech text, and the user relationship data. Determination on the speaker ID will be described later.

At step S123, the voice synthesis control unit 57 determines whether or not the dictionary whose classification according to the speech user ID is coincident with the speaker ID determined at step S122 is present in the voice synthesis dictionary DB #5.

As described above, classification of the learning data set according to the speech user ID is performed upon learning of the voice synthesis dictionary, and the speech user ID used for classification is set as the speaker ID for each dictionary. At this point, it is determined whether or not there is a dictionary for which the same speaker ID as the speaker ID determined at step S122 has been set.

In a case where it is, at step S123, determined that there is no dictionary whose classification according to the speech user ID is coincident with the determined speaker ID, the voice synthesis control unit 57 selects the standard speaker synthesis dictionary at step S124. Thereafter, the processing returns to step S108 of FIG. 14, and processing at step S108 and subsequent steps is performed.

On the other hand, in a case where it is, at step S123, determined that there is a dictionary whose classification according to the speech user ID is coincident with the determined speaker ID, the voice synthesis control unit 57 selects, as a scoring target, a dictionary group whose classification according to the speech user ID is coincident the speaker ID at step S125.

At step S126, the voice synthesis control unit 57 determines the noise level of the system speech. Determination on the noise level will be described later.

At step S127, the voice synthesis control unit 57 increases, among the dictionaries as the scoring targets, the score of the dictionary whose classification according to the noise level is coincident with the noise level determined at step S126.

Moreover, at step S128, the voice synthesis control unit 57 decreases, among the dictionaries as the scoring targets, the score of the dictionary whose classification according to the noise level is not coincident with the noise level determined at step S126.

Classification of the learning data set according to the noise level is performed upon learning of the voice synthesis dictionary, and the noise level used for classification is set for each dictionary. At this point, addition is made for the score of the dictionary for which the same noise level as the noise level determined at step S126 has been set, and subtraction is made for the score of the dictionary for which a different noise level has been set. The score of the dictionary for which no classification according to the noise level has been made is taken as no change.

At step S129, the voice synthesis control unit 57 determines the speech destination ID of the system speech. Determination on the speech destination ID will be described later.

At step S130, the voice synthesis control unit 57 increases, among the dictionaries as the scoring targets, the score of the dictionary whose classification according to the speech destination ID is coincident with the speech destination ID determined at step S129.

Moreover, at step S131, the voice synthesis control unit 57 decreases, among the dictionaries as the scoring targets, the score of the dictionary whose classification according to the speech destination ID is not coincident with the speech destination ID determined at step S129.

Classification of the learning data set according to the speech destination ID is performed upon learning of the voice synthesis dictionary, and the speech destination ID used for classification is set for each dictionary. At this point, addition is made for the score of the dictionary for which the same speech destination ID as the speech destination ID determined at step S129 has been set, and subtraction is made for the score of the dictionary for which a different speech destination ID has been set. The score of the dictionary for which no classification according to the speech destination ID has been made is taken as no change.

At step S132, the voice synthesis control unit 57 determines the emotion of the system speech. Determination on the emotion will be described later.

At step S133, the voice synthesis control unit 57 increases, among the dictionaries as the scoring targets, the score of the dictionary whose classification according to the emotion is coincident with the emotion determined at step S132.

Moreover, at step S134, the voice synthesis control unit 57 decreases, among the dictionaries as the scoring targets, the score of the dictionary whose classification according to the emotion is not coincident with the emotion determined at step S132.

Classification of the learning data set according to the emotion is performed upon learning of the voice synthesis dictionary, and the emotion used for classification is set for each dictionary. At this point, addition is made for the score of the dictionary for which the same emotion as the emotion determined at step S132 has been set, and subtraction is made for the score of the dictionary for which a different emotion has been set. The score of the dictionary for which no classification according to the emotion has been made is taken as no change.

At step S135, the voice synthesis control unit 57 selects, as the dictionary to be used for the system speech, the dictionary for which the highest score has been obtained from the dictionaries as the scoring targets.

For example, in a case where the speaker ID="A", the noise level="low", the speech destination ID="B", and the emotion="joy" are determined, the dictionary D31 of FIG. 12 is selected. Moreover, in a case where the speaker ID="A" and the emotion="calm" are determined, the dictionary D39 is selected.

Note that in a case where there are a plurality of dictionaries for which the highest score has been obtained, one of the dictionaries for which the highest score has been obtained is randomly selected for providing novelty to the system speech.

Thereafter, the processing returns to step S108 of FIG. 14, and voice synthesis is performed using the dictionary for which the highest score has been obtained.

By the above-described processing, the dictionary most meeting the conditions (the statuses) used for each classification upon learning can be selected from the dictionaries present in the voice synthesis dictionary DB #5.

Note that a score value to be added or subtracted according to each classification of the noise level, the speech destination ID, and the emotion may be the same value, or may be a value whose weight is adjusted according to each classification.

Determination Example (Example of Processing of Step S122 of FIG. 15) of Speaker ID of System Speech First Determination Example In a case where the contents of the system speech text are a request or an instruction, the voice synthesis control unit 57 refers to the user relationship data, and determines, as the speaker ID, the individual identification information regarding the request/instruction user with the highest acceptance score when the user targeted for the system speech is the receiving user.

That is, in a case where the user relationship data shows the scores illustrated in FIG. 10 and the user targeted for the system speech is the user B, the individual identification information regarding the user A as the request/instruction user with the highest acceptance score is determined as the speaker ID.

Accordingly, when the system speech for the request or the instruction is made, the speaker of the voice assumed as being most acceptable is selected as the speaker. In this case, the user as the speech destination is first selected, and the user as the speaker is selected according to the user as the speech destination. The processing of each step of FIG. 15 is performed with the order of these steps being changed as necessary.

Figure 16:
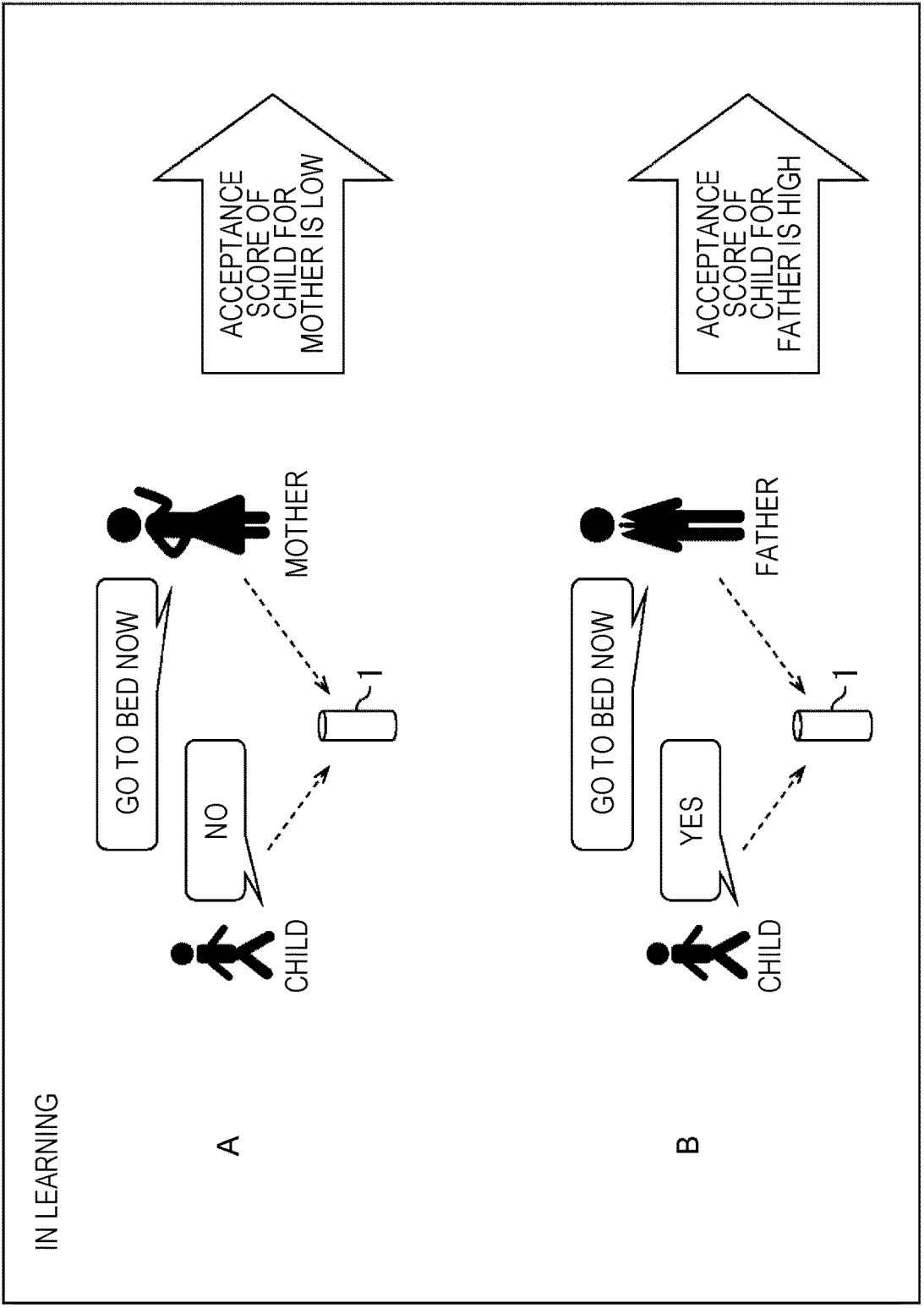
FIG. 16 is a view of an example of learning at home.

FIG. 16 is a view of an example of learning at home.

For example, in a daily life, in a case where the child refuses even when the mother tells the child that "go to bed now", learning is performed on the basis of such communication, and therefore, the acceptance score of the child for the mother is low as indicated by an arrow of A of FIG. 16.

On the other hand, when the child agrees in a case where the father provides an instruction of "go to bed now", learning is performed on the basis of such communication, and therefore, the acceptance score of the child for the father is high as indicated by an arrow of B of FIG. 16.

Figure 17:
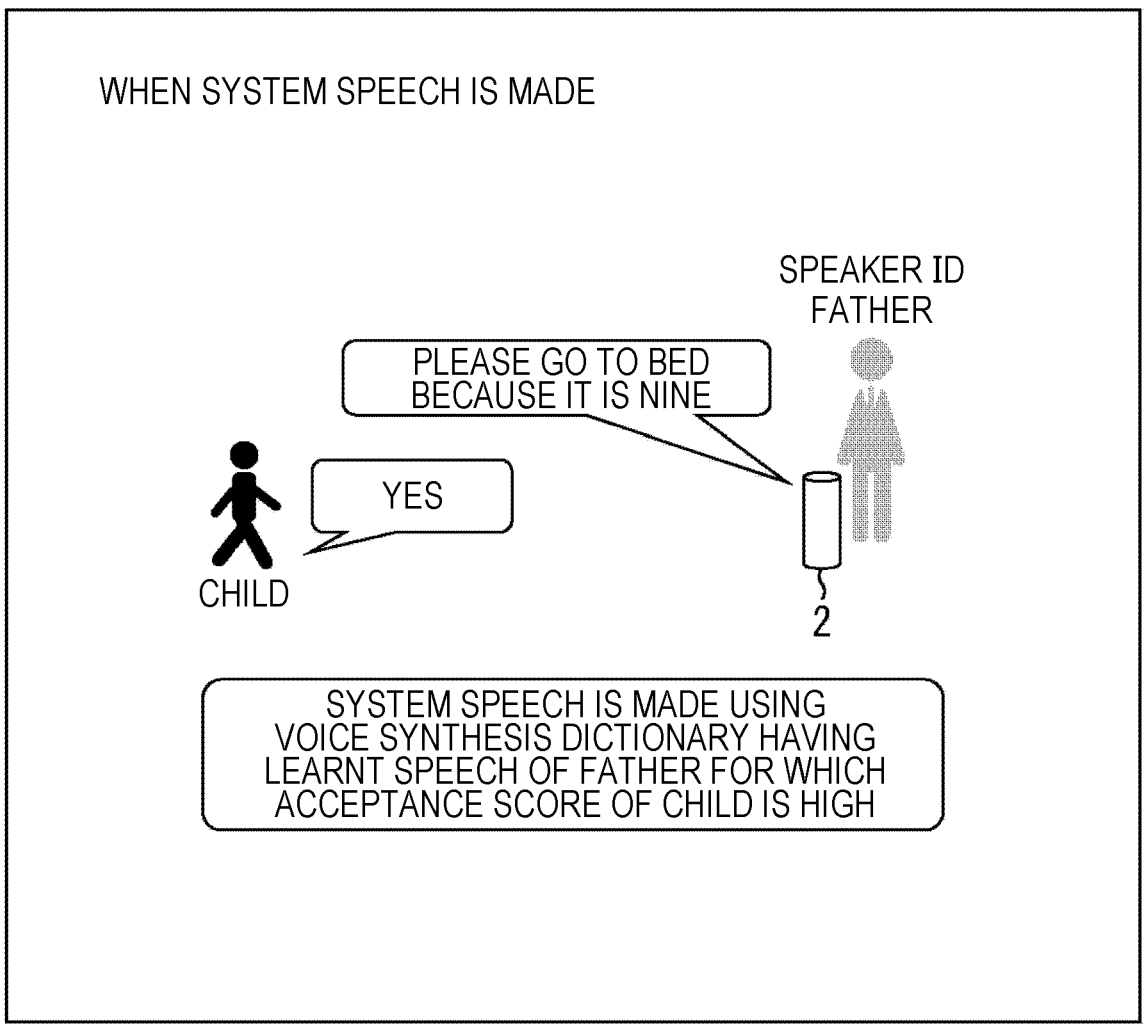
FIG. 17 is a view of an example of a system speech.

Leaning of the user relationship data is performed in this manner, and in a case where a system speech of "go to bed because it is nine" is made for the child, the speaker ID="father" is determined. Moreover, as illustrated in FIG. 17, voice synthesis is performed using the dictionary for which the speaker ID="father" has been set, and the system speech obtained by voice synthesis is output for the child. Thus, the system speech easily obtaining agreement from the child can be made.

As described above, for a notification of "it is time to . . . " at the timing of taking predetermined action, the system speech can be made using, as the speaker, the user for which the acceptance score of the user as the system speech target is highest. The notification of the child's bedtime has been described herein, but various notifications of child's tooth brushing time, child's bath time, etc. are also similarly made.

Second Determination Example

In a case where the contents of the system speech text are a message from a specific user, such as a mail or a voice-mail, the voice synthesis control unit 57 determines, as the speaker ID, the individual identification information regarding the user as a message source.

Figure 18:
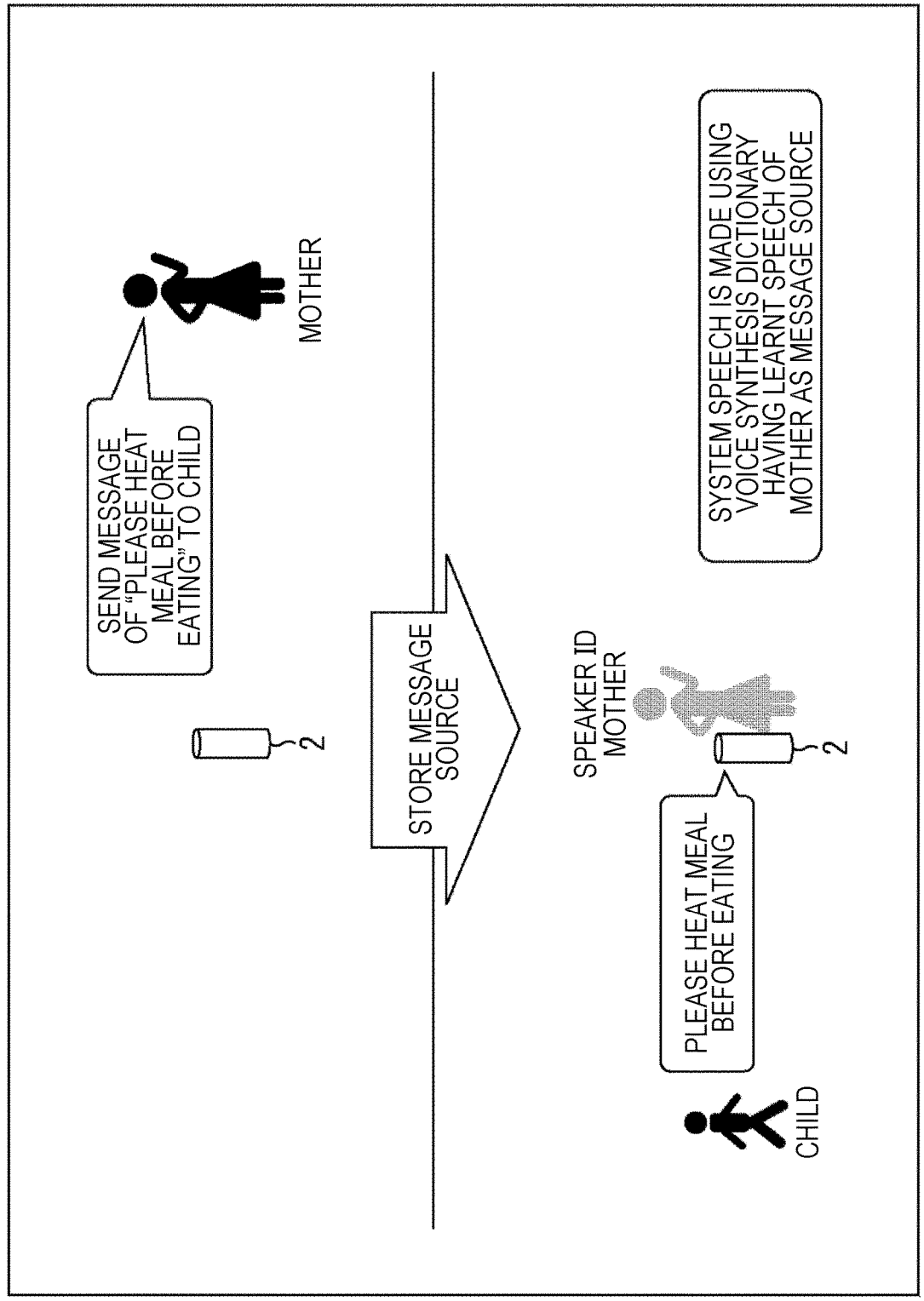
FIG. 18 is a view of an example of the system speech.

FIG. 18 is a view of an example of the system speech.

For example, as illustrated on an upper side of FIG. 18, in a case where the mother makes a speech of "send a message of 'please heat a meal before eating' to the child" for the voice synthesis device 2, text data of "please heat the meal before eating" is acquired as the system speech text. The system speech text is stored together with the information (the speech user ID) indicating that the message source is the mother.

Thereafter, in a case where the timing of making the system speech, such as the timing of detecting that the child is present, comes, the speaker ID="mother" is determined. Moreover, as illustrated in FIG. 18, the mother is taken as the speaker, and voice synthesis is performed using the dictionary with the speaker ID="mother". Then, a system speech of "please heat the meal before eating" is output for the child.

As described above, for notification of, e.g., messages of "good luck, today" and "do you have a key?", the system speech can be made using, as the speaker, the user as the message source.

In a case where a notification of "you have a mail from the father, and 'it will be late tonight'" is provided to the mother and the child via the system speech, voice synthesis may be performed using the standard speaker synthesis dictionary for a system speech of "you have the mail from the father" and using the dictionary with the speaker ID="father" for a system speech of "it will be late tonight". As described above, a plurality of dictionaries may be used in combination for each system speech.

Third Determination Example

In a case where the contents of the system speech text are a highly-urgent notification, the voice synthesis control unit 57 determines, as the speaker ID, the individual identification information regarding the user in the same room as the user as the speech target or the user having a conversation with the user as the speech target. The user in the same room as the user as the speech target or the user having the conversation with the user as the speech target is, for example, specified by the context information.

The voice of the user in the same room or the user having the conversation with the user as the speech target tends to be easily noticed, and therefore, the speaker ID is determined as described above for the system speech so that attention of the user as the speech target can be turned to the system speech.

Figure 19:
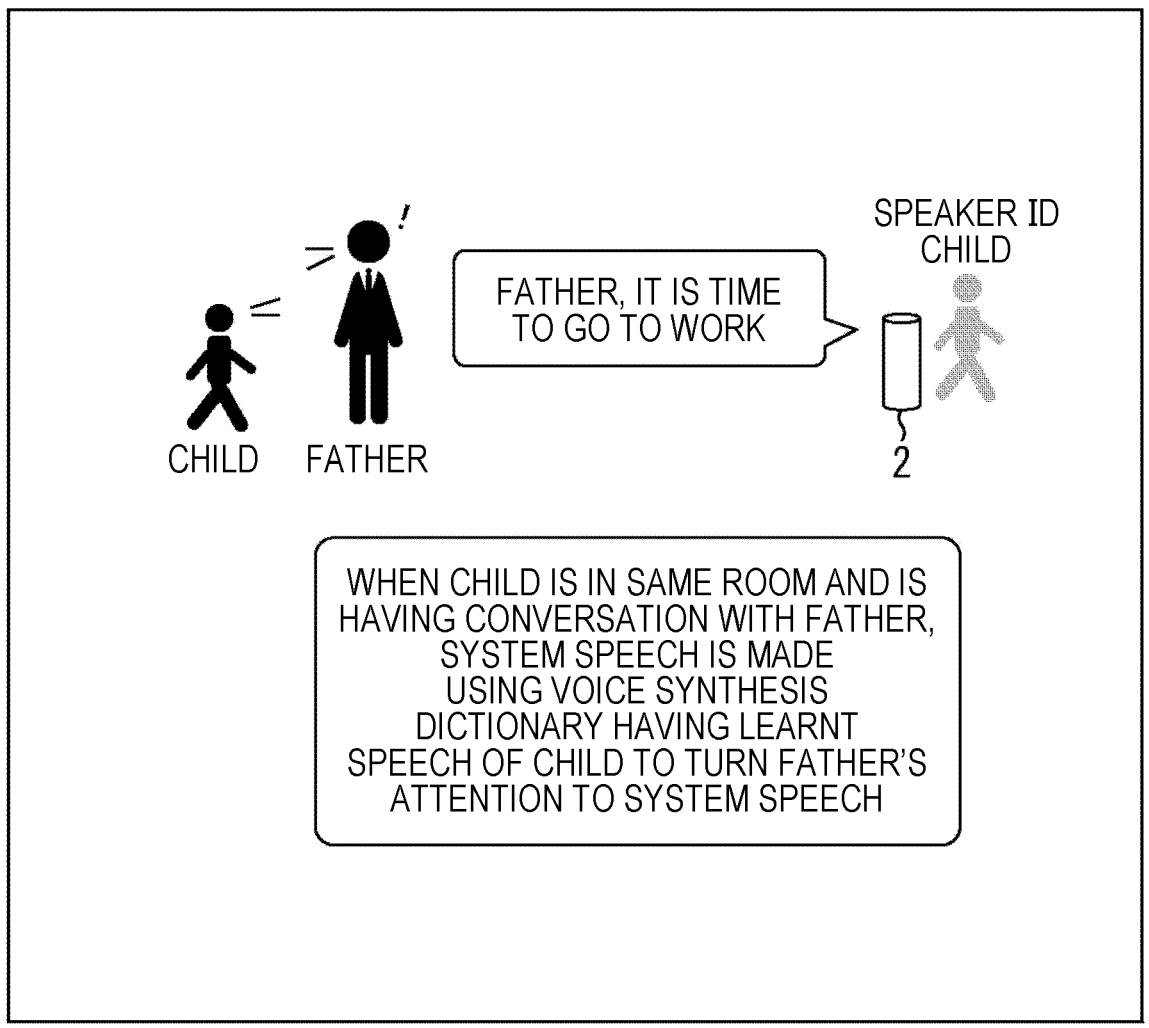
FIG. 19 is a view of an example of the system speech.

FIG. 19 is a view of an example of the system speech.

In a case where the speech target is the father and a notification of "it is time to go to work" is made via the system speech, when the child is in the same room and is having a conversation with the father, a system speech of "it is time to go to work" is output using the dictionary with the speaker ID="child".

On a father's side, the system speech of "it is time to go to work" is made using the voice of the child just having the conversation with the father, and therefore, the father reacts to such a notification and turns one's attention to the notification.

Fourth Determination Example

In a case where the contents of the system speech text are a notification of a schedule for which participants have been registered, the voice synthesis control unit 57 determines, as the speaker ID, the individual identification information regarding the user participating together with the user as the speech target.

Figure 20:
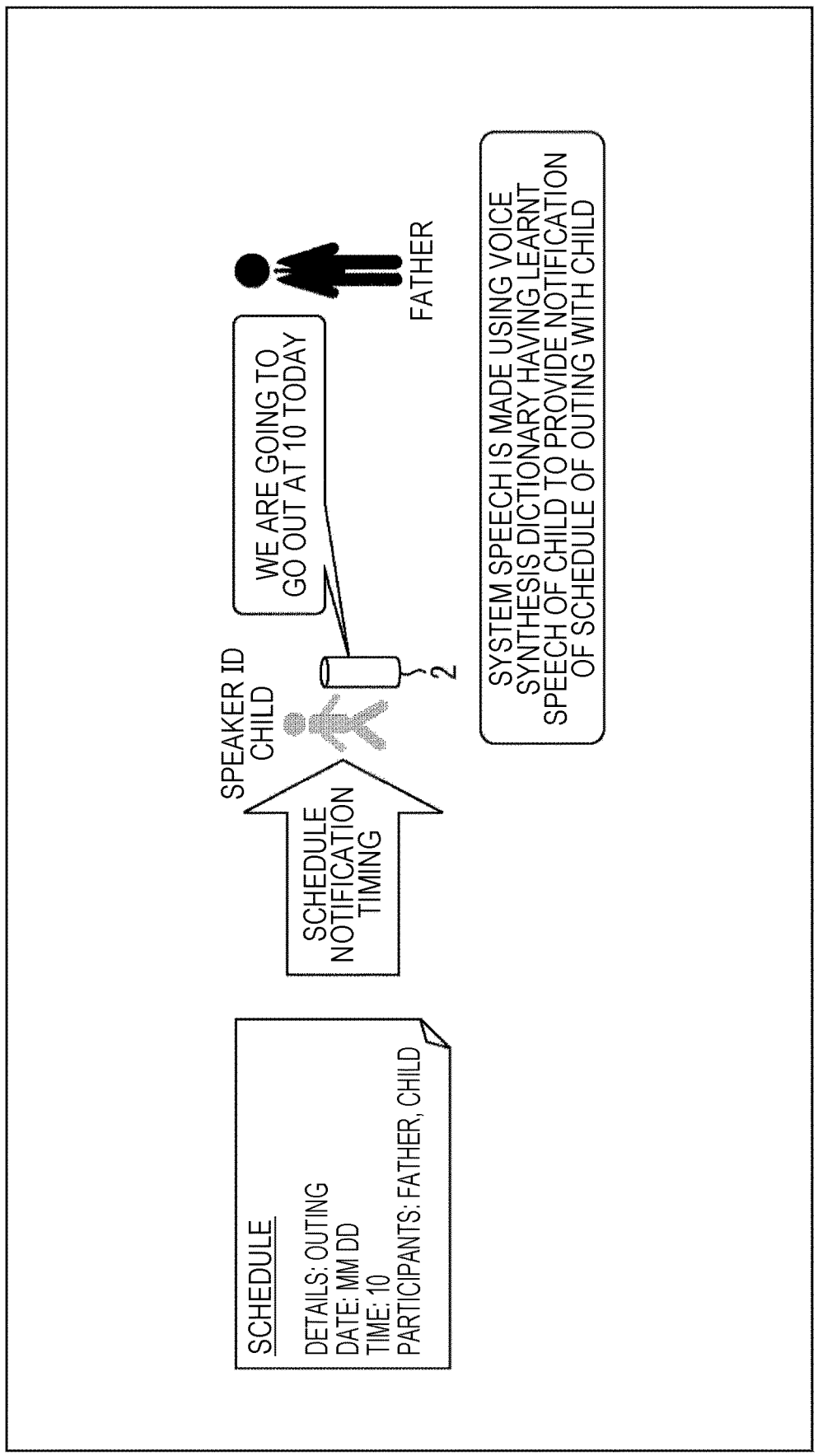
FIG. 20 is a view of an example of the system speech.

FIG. 20 is a view of an example of the system speech.

As illustrated on a left side of FIG. 20, a schedule that the father and the child will go outside together is registered. In a case where these contents are given in notification via the system speech, when the father is the speech target, e.g., a system speech of "we are going to go out at ten today" is made using the child as the speaker. Moreover, when the child is the speech target, e.g., the system speech of "we are going to go out at ten today" is made using the father as the speaker.

As described above, determination on the speaker is performed on the basis of various conditions such as the contents of the system speech text, the relationship between the users, and the statuses. The voice synthesis control unit 57 functions as a control unit configured to select the user as the speaker at least on the basis of the user relationship data.

In a case where learning has been performed using the voice of other members than the family, such as a friend often coming to visit the home and a TV character, such a speaker of the voice may be selected as the speaker.

Determination Example (Example of Processing of Step S126 of FIG. 15) of Noise Level of System Speech The voice synthesis control unit 57 determined the noise level (high/middle/low) in the system speech on the basis of the context information.

Noise varies according to each type of environment, and therefore, the dictionary obtained by learning is one obtained by learning also including a Lombard effect when a person actually living under individual environment makes a speech according to noise. The Lombard effect is a change shown in a voice quality or tone under noise when a speech is made.

By the system speech having the Lombard effect, an easy-to-hear system speech can be made.

Determination Example (Example of Processing of Step S129 of FIG. 15) of Speech Destination ID of System Speech In a case where the user as the speech target can be clearly specified from the contents of the system speech text and the statuses, the voice synthesis control unit 57 determines the individual identification information regarding such a user as the speech destination ID.

For example, in a case where a message for a specific user is given in notification via the system speech, the individual identification information regarding the user as a message destination is determined as the speech destination ID. Moreover, in a case where a schedule registered by a specific user is given in notification via the system speech, the individual identification information regarding the user having registered such a schedule is determined as the speech destination ID. In a case where a request or an instruction for a specific user is given in notification via the system speech, the individual identification information regarding the user as a target for such a request or instruction is determined as the speech destination ID.

Moreover, in a case where the contents of the system speech are not for a specific user, the voice synthesis control unit 57 determines, as the speech destination ID, the individual identification information regarding a user detected as being around the voice synthesis device 2 by image recognition.

For example, in a case where news or a weather report is given in notification via the system speech, the individual identification information regarding the user around the voice synthesis device 2 is determined as the speech destination ID. For notification of an alert from the system, the individual identification information regarding the user around the voice synthesis device 2 is determined as the speech destination ID.

Determination Example (Example of Processing of Step S132 of FIG. 15) of Emotion of System Speech The voice synthesis control unit 57 analyzes the contents of the system speech text by the natural language processing and the semantic analysis processing. In the case of positive contents, the voice synthesis control unit 57 determines the contents as "joy". In the case of negative contents, the voice synthesis control unit 57 determines the contents as "sadness". In a case where the contents are neither the positive contents nor the negative contents, the voice synthesis control unit 57 determines the contents as "calm".

For example, in a case where the system speech relates to the weather report and the contents thereof are "it is a fine comfortable climate today", the contents are determined as "joy". On the other hand, in a case where "it is going to snow and get colder this afternoon", the contents are determined as "sadness".

Moreover, in a case where the system speech text is a message such as a mail, the voice synthesis control unit 57 determines any emotion of "joy", "sadness", and "anger" on the basis of the contents of the message.

For example, in a case where the contents of the message are "happy birthday", the contents are determined as "joy". In a case where "it will be late tonight because of a train delay", the contents are determined as "sadness". On the other hand, in a case where "why didn't you tell me?", the contents are determined as "anger".

In an example at home, in a case where the child having entered a place where the child is not allowed to enter, such as a kitchen, has been detected, the individual identification information of the father as the speaker for which the acceptance score of the child is highest is determined as the speaker ID. Moreover, "anger" is determined as the emotion on the basis of the contents of the system speech text of "do not enter there". Thus, the system speech for warning "do not enter there" via the voice of the father is made.

In the case of repeatedly outputting the same system speech meaning a request or an instruction, the emotion may be changed in the order of "joy", "calm", and "anger" every time the number of repetitions increases. For example, in a case where the system speech for wake-up in the morning is made, if the user makes no reaction even when the system speech is made, the emotion is changed by repetition of the same system speech, and therefore, the system speech is gradually made with stronger words.

By a series of processing described above by the learning device 1 and the voice synthesis device 2, user's attention to the system speech and the depth of user's understanding of the system speech can be improved.

That is, the speech is made with the voice quality and the tone of a person (e.g., the family in the case of the home) usually living together, and a so-called cocktail party effect is induced. The user as the speech destination tends to turn one's attention to the system speech. Moreover, the user can understand the intention of the system speech, and therefore, can more understand the speech contents.

Moreover, by a series of processing described above, the system speech according to user's individual statuses can be made.

That is, learning of the voice synthesis dictionary is performed according to a situation varying according to the user, such as living environment, on the basis of an actual speech of a person living in such a situation. Thus, the system speech with an optimal voice quality and an optimal tone according to individual statuses can be made. Normally, in a family conversion, a speech is made with the voice quality and the tone being changed according to various statuses such as noise environment varying according to individual family. Such a speech can be reproduced.

Further, by a series of processing described above, many system speech variations can be provided.

As described above, learning of the voice synthesis dictionary is performed in such a manner that the user's speech is sequentially learnt. Thus, as the device is used, the voice quality and the tone of the system speech change to gradually resemble the user. Moreover, the voice quality and the tone also change according to the speech partner and the statuses. Therefore, more system speech variations are provided, and the novelty is provided. Consequently, continuous use by the user without tiresomeness and habituation can be realized.

Configuration Example of Equipment

Figure 21:
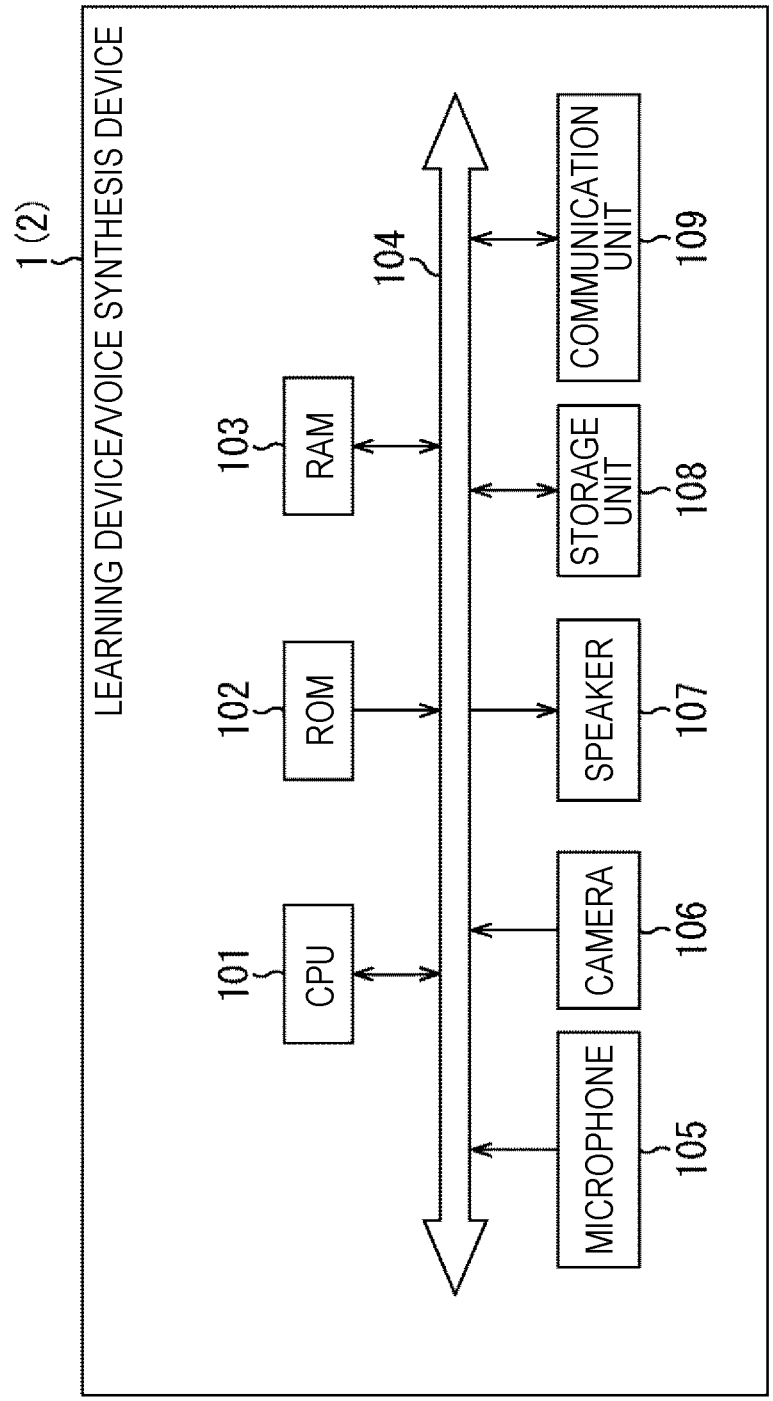
FIG. 21 is a block diagram of a hardware configuration example of the learning device.

FIG. 21 is a block diagram of a hardware configuration example of the learning device 1.

At least part of the configuration illustrated in FIG. 3 is implemented in such a manner that a CPU 101 of FIG. 21 executes a predetermined program.

The central processing unit (CPU) 101, a read only memory (ROM) 102, and a random access memory (RAM) 103 are connected to each other via a bus 104.

A microphone 105, a camera 106, and a speaker 107 are connected to the bus 104. The microphone 105 corresponds to the voice input device 13 of FIG. 3, and the camera 106 corresponds to the sensor device 11 of FIG. 3. The statuses in learning are detected on the basis of speech voice detected by the microphone 105 and an image captured by the camera 106, and learning of the voice synthesis data is performed.

Moreover, a storage unit 108 and a communication unit 109 are also connected to the bus 104.

The storage unit 108 includes, for example, a hard drive and a non-volatile memory. The storage unit 108 stores, in addition to the program to be executed by the CPU 101, various types of data such as the voice synthesis data.

The communication unit 109 includes, for example, a network interface. The communication unit 109 communicates, via wireless or wired communication, with external equipment, such as a mobile phone carried by the user or a server on the Internet.

The voice synthesis device 2 also has the configuration illustrated in FIG. 21. In this case, the microphone 105 corresponds to the voice input device 53 of FIG. 13, and the camera 106 corresponds to the sensor device 51 of FIG. 13. Moreover, the speaker 107 corresponds to the voice reproduction device 62 of FIG. 13. The statuses when the system speech is made are detected on the basis of the speech voice detected by the microphone 105 and the image captured by the camera 106. Moreover, the system speech voice is output from the speaker 107.

In the above-described configuration, the learning device 1 and the voice synthesis device 2 are provided as separate devices, but may be provided as a single agent device having these functions.

Figure 22:
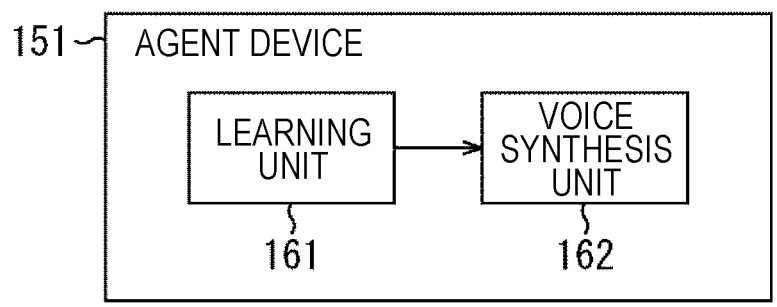
FIG. 22 is a block diagram of a configuration example of an agent device.

FIG. 22 is a block diagram of a configuration example of an agent device 151.

The agent device 151 has the same configuration as the hardware configuration illustrated in FIG. 21. The CPU 101 of the agent device 151 executes a predetermined program to implement a learning unit 161 and a voice synthesis unit 162 in the agent device 151 as illustrated in FIG. 22.

The learning unit 161 basically has a configuration similar to the configuration illustrated in FIG. 3. The learning unit 161 detects the statuses on the basis of the speech voice detected by the sensor device 11 (the microphone 105 of FIG. 21) and the image captured by the voice input device 13 (the camera 106 of FIG. 21), and sequentially performs learning of the voice synthesis data. The learning unit 161 outputs the voice synthesis data to the voice synthesis unit 162.

The voice synthesis unit 162 basically has a configuration similar to the configuration illustrated in FIG. 13. The voice synthesis unit 162 detects the statuses on the basis of the speech voice detected by the voice input device 53 (the microphone 105 of FIG. 21) and the image captured by the sensor device 51 (the camera 106 of FIG. 21). The voice synthesis unit 162 refers to the voice synthesis data generated by the learning unit 161, and outputs the system speech voice according to the statuses from the voice reproduction device 62 (the speaker 107 of FIG. 21).

Of the configuration included in the learning unit 161 as illustrated in FIG. 3 and the configuration included in the voice synthesis unit 162 as illustrated in FIG. 13, corresponding configurations can be provided as a common configuration. That is, only one of the sensor device 11 or the sensor device 51, only one of the image recognition unit 12 or the image recognition unit 52, only one of the voice input device 13 or the voice input device 53, only one of the voice signal processing unit 14 or the voice signal processing unit 54, only one of the voice recognition unit 15 or the voice recognition unit 55, and only one of the context estimation unit 16 or the context estimation unit 56 may be provided.

Figure 23:
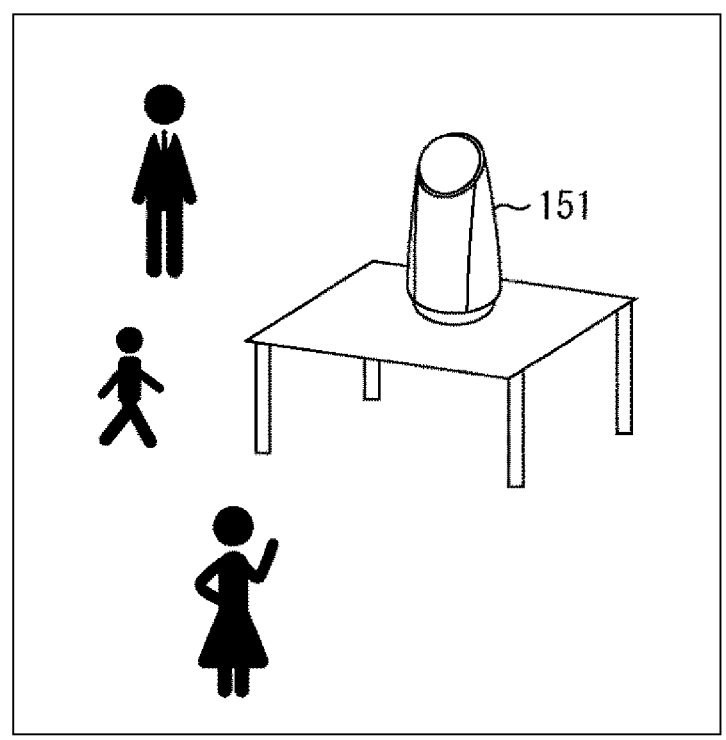
FIG. 23 is a view of usage of the agent device.

For example, as illustrated in FIG. 23, the agent device 151 is, at home, provided at such a position that the user's speech can be detected and the user can hear the system speech, and is used as a home agent device.

Note that the form of equipment used as the home agent device is not limited to the form illustrated in FIG. 23. Application to various forms of equipment provided with a camera, a microphone, and a speaker and configured so that the system speech can be made by learning of the voice synthesis data and voice synthesis is allowed.

In, e.g., a smartphone, a tablet terminal, a PC, a television receiver, white goods such as an air conditioner and a refrigerator, and an automobile, the above-described home agent device can be implemented.

Learning of the voice synthesis data and voice synthesis using the voice synthesis data may be performed in a server on the basis of information transmitted from a client device.

In this case, the data on the image captured by the sensor device 11 and the speech voice detected by the voice input device 13 is transmitted from the client device to the server. Such data is used for learning of the voice synthesis data upon learning, and is used for voice synthesis upon voice synthesis. The system speech voice waveform data obtained by voice synthesis is transmitted from the server to the client device, and is reproduced in the client device to output the system speech voice.

As described above, at least some functions of the learning device 1 and the voice synthesis device 2 may be implemented in other devices than the client device, the other devices including microphones, cameras, and speakers.

First Variation

Information regarding user's speech time may be included in the context information, and may be used for learning of the voice synthesis data. Accordingly, the voice synthesis data is obtained by learning of the user's speech tone changing in morning, noon, night, and midnight. In this case, similarly for the system speech, the tone changes in morning, noon, night, and midnight.

As described above, various statuses changing the tone other than the speech user ID, the emotion, the noise amount, and the speech destination ID can be used as the context information used for learning and voice synthesis. For example, the statuses detectable by various sensors other than the microphone and the camera and changing the tone, such as a weather, a temperature, a humidity, and a position, may be included in the context information, and may be used for learning and voice synthesis.

The image captured by the camera may be analyzed to specify, e.g., a person in a room and the age and gender of the user, and such information may be included in the context information.

When the system speech such as a voice-mail or a message is made, a sound effect or BGM according to the speaker may be output at the beginning of the system speech. Accordingly, the speaker of the system speech can be easily recognizable.

In learning using the user's speech, opening words or a final phrase often used in the user's speech may be learnt. Accordingly, when the system speech is made, the system speech is made with addition of words to the beginning of the system, speech or a change in a final phrase of the system speech being made according to the speaker.

For example, in a case where the child often makes a speech with "you see" being added to the beginning of the speech, when the system speech whose speaker is the child is made, "you see" is added to the beginning of such a system speech. Moreover, in a case where the child often makes a speech with a phrase of "you know" being added to the end of the speech, when a system speech of "we are going to go out at nine today" is made using the child as the speaker, a system speech of "we are going to go out at nine today, you know" is made with the final phrase being changed.

Second Embodiment (Example Using Voice Synthesis Network)

Learning of Voice Synthesis Network

The case of using the voice synthesis dictionary as the voice synthesis data has been described above, but a voice synthesis network including a neural network may be also used.

In this case, in a learning device 1, the voice synthesis network is generated using user speech waveform voice data as data on user's speech voice, user speech text as a voice recognition result of the speech voice, and context information.

Moreover, in a voice synthesis device 2, system speech text and voice synthesis context information are input to the voice synthesis network, and in this manner, system speech voice waveform data is output. The system speech voice waveform data output from the voice synthesis network is, as described above, according to a user as a speech destination and surrounding statuses.

Configuration Example of Learning Device

Figure 24:
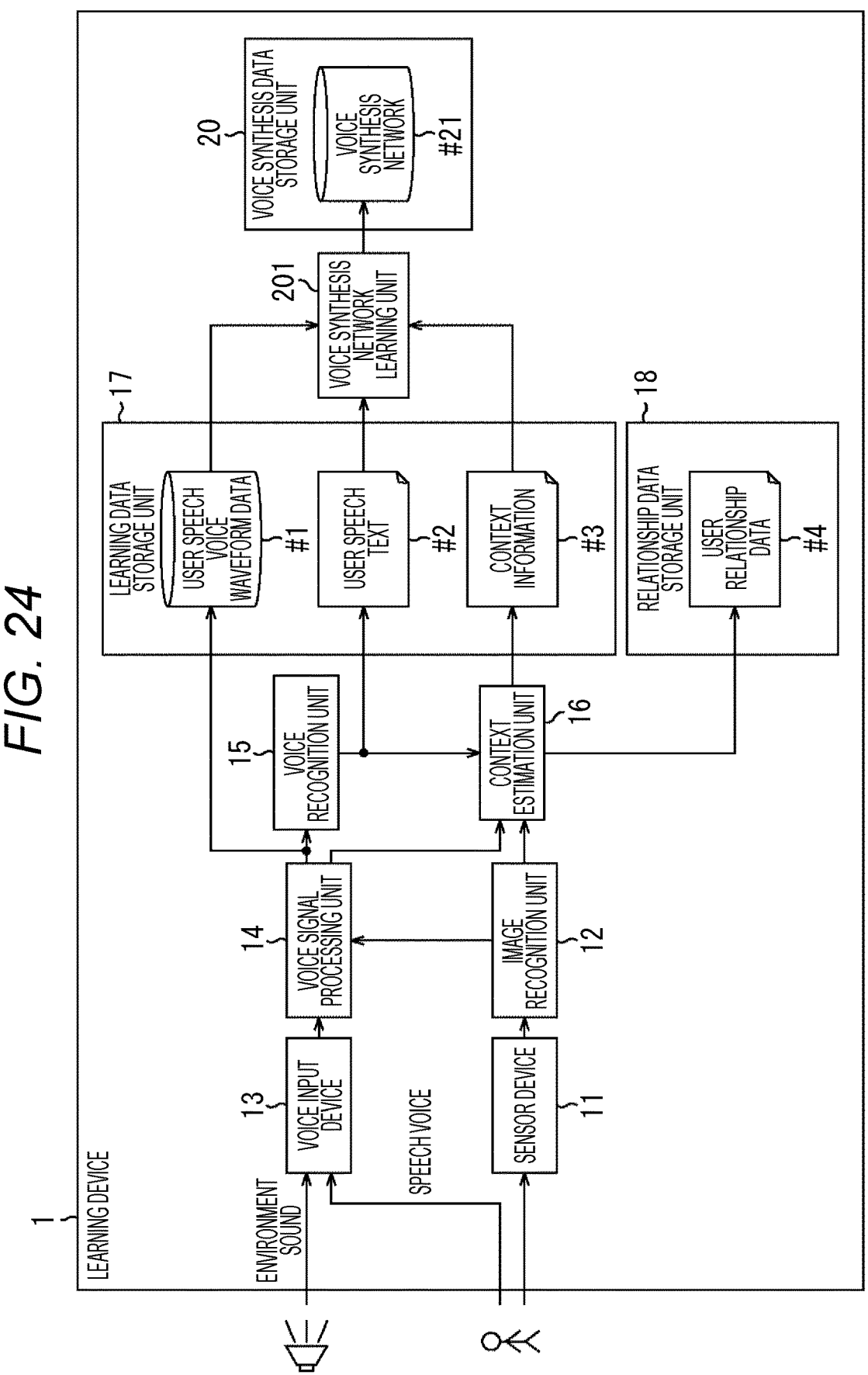
FIG. 24 is a block diagram of another configuration example of the learning device.

FIG. 24 is a block diagram of a configuration example of the learning device 1 using the voice synthesis network as the voice synthesis data. The same reference numerals are used to represent the same configuration as the configuration of FIG. 3 in the configuration illustrated in FIG. 24. Overlapping description will be omitted as necessary.

The configuration of the learning device 1 illustrated in FIG. 24 is different from the configuration of the learning device 1 illustrated in FIG. 3 in that a voice synthesis network learning unit 201 is provided instead of the voice synthesis dictionary learning unit 19. The learning device 1 includes a sensor device 11, an image recognition unit 12, a voice input device 13, a voice signal processing unit 14, a voice recognition unit 15, a context estimation unit 16, a learning data storage unit 17, a relationship data storage unit 18, a voice synthesis data storage unit 20, and the voice synthesis network learning unit 201.

The sensor device 11 performs imaging, and outputs an image captured by imaging to the image recognition unit 12.

The image recognition unit 12 performs facial recognition to detect the face of the user on the captured image. Moreover, the image recognition unit 12 analyzes the captured image to identify the user and estimate an emotion on the basis of facial expression of the user.

The image recognition unit 12 outputs direction information and individual identification information regarding each user to the voice signal processing unit 14. Moreover, the image recognition unit 12 outputs, to the context estimation unit 16, information indicating the direction, the individual identification information, and the emotion of each user.

The voice input device 13 detects voice emitted from the user around the learning device 1 and environment sound to output an input voice signal to the voice signal processing unit 14.

The voice signal processing unit 14 performs sound source separation processing for the input voice signal to extract a voice signal taking, as a sound source direction, the same direction as the user direction. Moreover, the voice signal processing unit 14 performs voice activity detection processing for the extracted voice signal to detect a voice signal in an activity in which the user is making a speech.

The voice signal processing unit 14 outputs the voice signal obtained in the activity in which the user is making a speech, and outputs, to the context estimation unit 16, information indicating a noise amount and a user speech direction. The voice signal output from the voice signal processing unit 14 is stored as user speech voice waveform data #1 in the learning data storage unit 17, and is supplied to the voice recognition unit 15.

The voice recognition unit 15 performs voice recognition for the voice signal of the speech voice, and outputs user speech text #2.

The context estimation unit 16 generates context information #3 on the basis of the input information, and outputs the context information #3. The context information #3 includes information indicating a speech user ID, the emotion, a noise level, and a speech destination ID. Moreover, the context estimation unit 16 generates user relationship data #4, and stores the user relationship data #4 in the relationship data storage unit 18.

The voice synthesis network learning unit 201 performs learning of the voice synthesis network by means of a learning data set stored in the learning data storage unit 17. That is, the voice synthesis network learning unit 201 uses the user speech text #2 and the context information #3 as input data of a voice synthesis network #21 and uses corresponding user speech voice waveform data as output data, thereby performing learning of the voice synthesis network #21.

Operation of Learning Device

Figure 25:
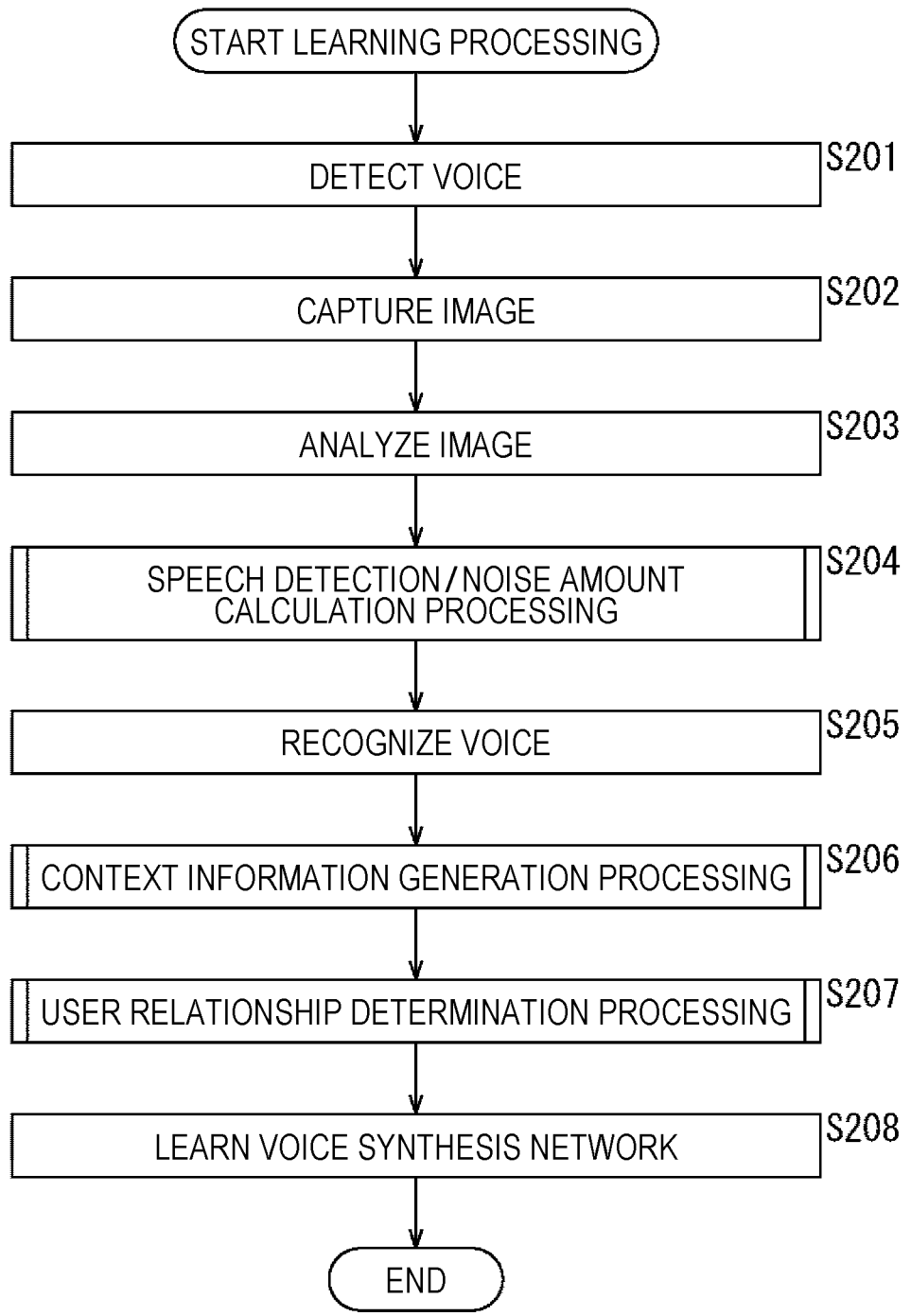
FIG. 25 is a flowchart for describing the learning processing of the learning device.

Learning processing of the learning device 1 having the above-described configuration will be described with reference to a flowchart of FIG. 25.

At step S201, the voice input device 13 detects the voice. The input voice signal including the user's speech voice and the environment sound is supplied to the voice signal processing unit 14.

At step S202, the sensor device 11 performs imaging. The image captured by imaging is supplied to the image recognition unit 12.

At step S203, the image recognition unit 12 analyzes the image to detect the face of the user on the image and identify the user. Moreover, the image recognition unit 12 estimates the emotion on the basis of the facial expression of the user. The direction information and the individual identification information regarding each user are supplied to the voice signal processing unit 14, and the direction information, the individual identification information, and the emotion information regarding each user are supplied as an image recognition result set to the context estimation unit 16.

At step S204, the voice signal processing unit 14 performs speech detection/noise amount calculation processing. The speech detection/noise amount calculation processing is processing similar to the processing described with reference to the flowchart of FIG. 6.

At step S205, the voice recognition unit 15 performs voice recognition for the voice signal supplied from the voice signal processing unit 14, and generates the user speech text.

At step S206, the context estimation unit 16 performs context information generation processing. The context information generation processing is processing similar to the processing described with reference to the flowchart of FIG. 8.

At step S207, the context estimation unit 16 performs user relationship determination processing. The user relationship determination processing is processing similar to the processing described with reference to the flowchart of FIG. 9.

At step S208, the voice synthesis network learning unit 201 uses the user speech text and the context information as the input data and uses the corresponding user speech voice waveform data as the output data, thereby performing learning of the voice synthesis network.

After learning of the voice synthesis network, a series of learning processing ends. The above-described processing is repeatedly performed at predetermined timing such as the timing of making a speech by the user.

Voice Synthesis Using Voice Synthesis Network

Configuration Example of Voice Synthesis Device

Figure 26:
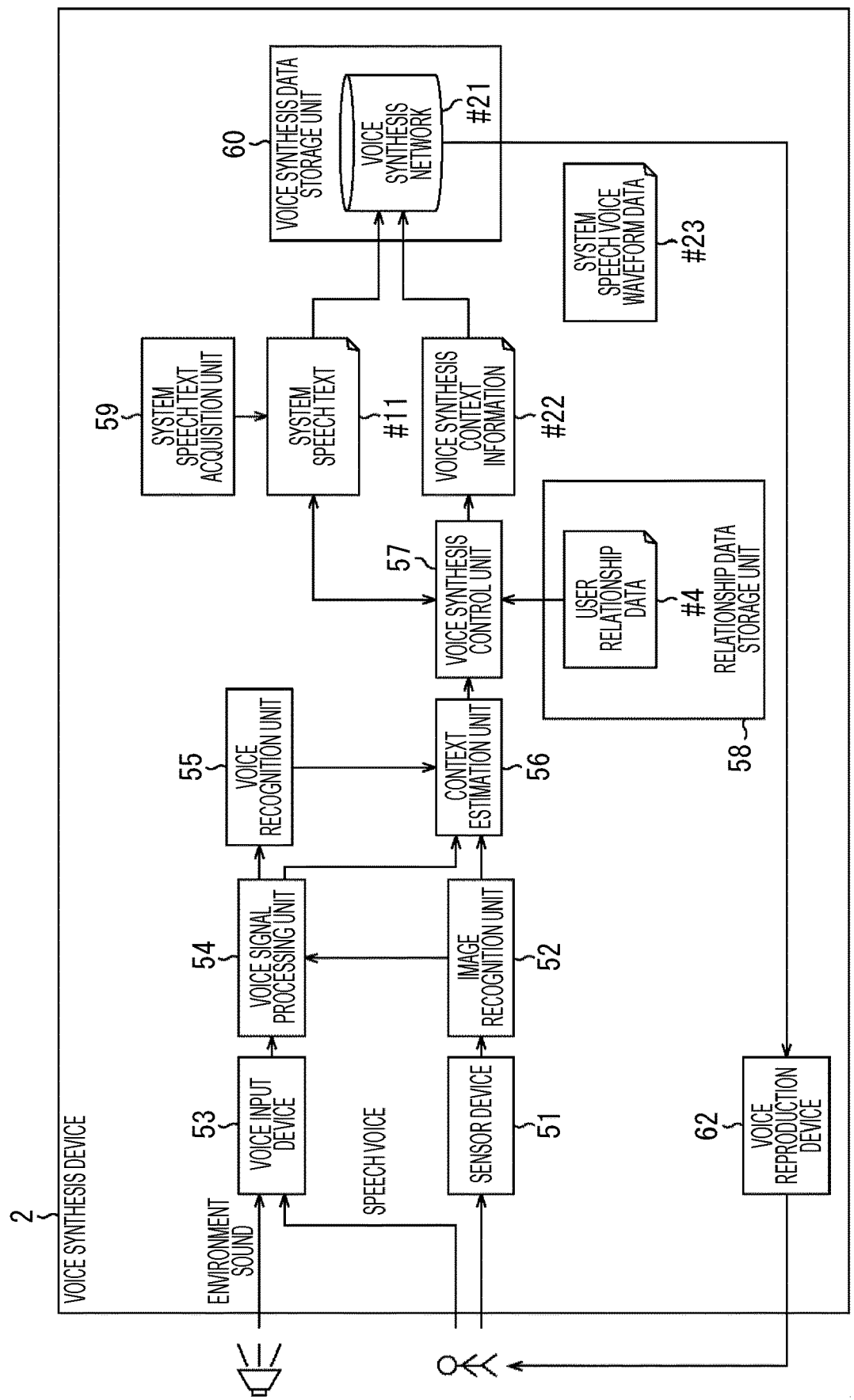
FIG. 26 is a block diagram of another configuration example of the voice synthesis device.

FIG. 26 is a block diagram of a configuration example of the voice synthesis device 2 using the voice synthesis network as the voice synthesis data. The same reference numerals are used to represent the same configuration as the configuration of FIG. 13 in the configuration illustrated in FIG. 26. Overlapping description will be omitted as necessary.

The voice synthesis device 2 includes a sensor device 51, an image recognition unit 52, a voice input device 53, a voice signal processing unit 54, a voice recognition unit 55, a context estimation unit 56, a voice synthesis control unit 57, a relationship data storage unit 58, a system speech text acquisition unit 59, a voice synthesis data storage unit 60, and a voice reproduction device 62. The configuration of the voice synthesis device 2 illustrated in FIG. 26 is different from the configuration illustrated in FIG. 13 in that the voice synthesis unit 61 is not provided.

The user relationship data #4 generated by the learning device 1 is stored in the relationship data storage unit 58, and the voice synthesis network #21 is stored in the voice synthesis data storage unit 60.

The sensor device 51 repeatedly performs imaging, and outputs an image captured by imaging to the image recognition unit 52.

The image recognition unit 52 performs facial recognition, and detects the face of the user on the captured image. Moreover, in a case where the face is on the image, the image recognition unit 52 analyzes the captured image to identify the user and estimate the emotion on the basis of the facial expression of the user.

The image recognition unit 52 outputs the direction information and the individual identification information regarding each user to the voice signal processing unit 54. Moreover, the image recognition unit 52 outputs, to the context estimation unit 56, the information indicating the direction, the individual identification information, and the emotion of each user.

The voice input device 53 detects sound around the voice synthesis device 2, and outputs the input voice signal to the voice signal processing unit 54.

The voice signal processing unit 54 performs the sound source separation processing for the input voice signals from a plurality of microphones, and extracts the voice signal taking, as the sound source direction, the same direction as the user direction indicated by the information supplied from the image recognition unit 52.

Moreover, the voice signal processing unit 54 performs the voice activity detection processing for the extracted voice signal to detect the voice signal in the activity in which the user is making a speech and obtain the noise amount. The voice signal processing unit 54 outputs, to the voice recognition unit 55, the voice signal obtained in the activity in which the user is making a speech, and outputs the information indicating the noise amount and the user speech direction to the context estimation unit 56.

The voice recognition unit 55 performs voice recognition for the signal of the speech voice supplied from the voice signal processing unit 54 to generate the user speech text, and outputs the user speech text to the context estimation unit 56.

The context estimation unit 56 generates the context information on the basis of the information supplied from each unit, and outputs the context information to the voice synthesis control unit 57. The context information includes the information indicating the speech user ID, the emotion, the noise level, and the speech destination ID. The context information generated by the context estimation unit 56 is information indicating the surrounding statuses when a system speech is made.

The context information #3, the user relationship data #4 stored in the relationship data storage unit 58, and system speech text #11 acquired by the system speech text acquisition unit 59 are input to the voice synthesis control unit 57.

The voice synthesis control unit 57 performs natural language processing and semantic analysis processing to analyze the contents of the system speech text. On the basis of the context information #3, the user relationship data #4, and the system speech text #11, the voice synthesis control unit 57 determines, as described above, a speaker ID, the noise level, the speech destination ID, and the emotion when the system speech is made.

Figure 27:
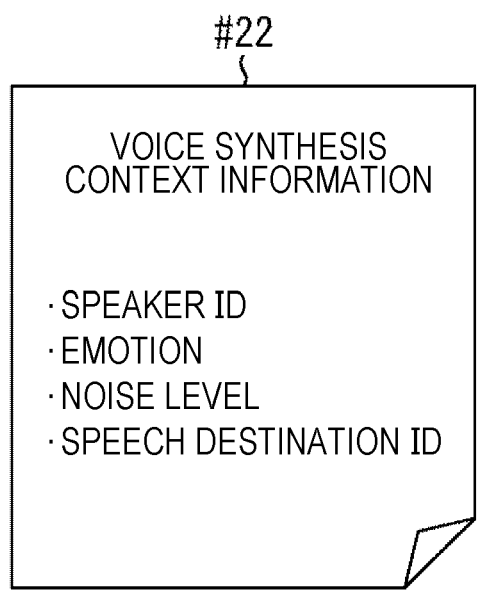
FIG. 27 is a diagram of an example of voice synthesis context information.

The voice synthesis control unit 57 generates voice synthesis context information #22 as illustrated in FIG. 27, the voice synthesis context information #22 including the information indicating the speaker ID, the noise level, the speech destination ID, and the emotion. The voice synthesis control unit 57 inputs, to the voice synthesis network #21, the generated voice synthesis context information #22 together with the system speech text #11 output from the system speech text acquisition unit 59.

According to input of the system speech text #11 and the voice synthesis context information #22, system speech voice waveform data #23 is output from the voice synthesis network #21. The voice synthesis network #21 functions as a generation unit configured to generate synthesized voice indicating the contents of the system speech text and corresponding to, e.g., the statuses when the system speech is made.

The system speech text acquisition unit 59 acquires and outputs the system speech text #11. The system speech text #11 output from the system speech text acquisition unit 59 is supplied to the voice synthesis control unit 57, and is input to the voice synthesis network #21.

The voice reproduction device 62 reproduces the system speech voice waveform data #23 output from the voice synthesis network #21, and outputs system speech voice.

Operation of Voice Synthesis Device

Figure 28:
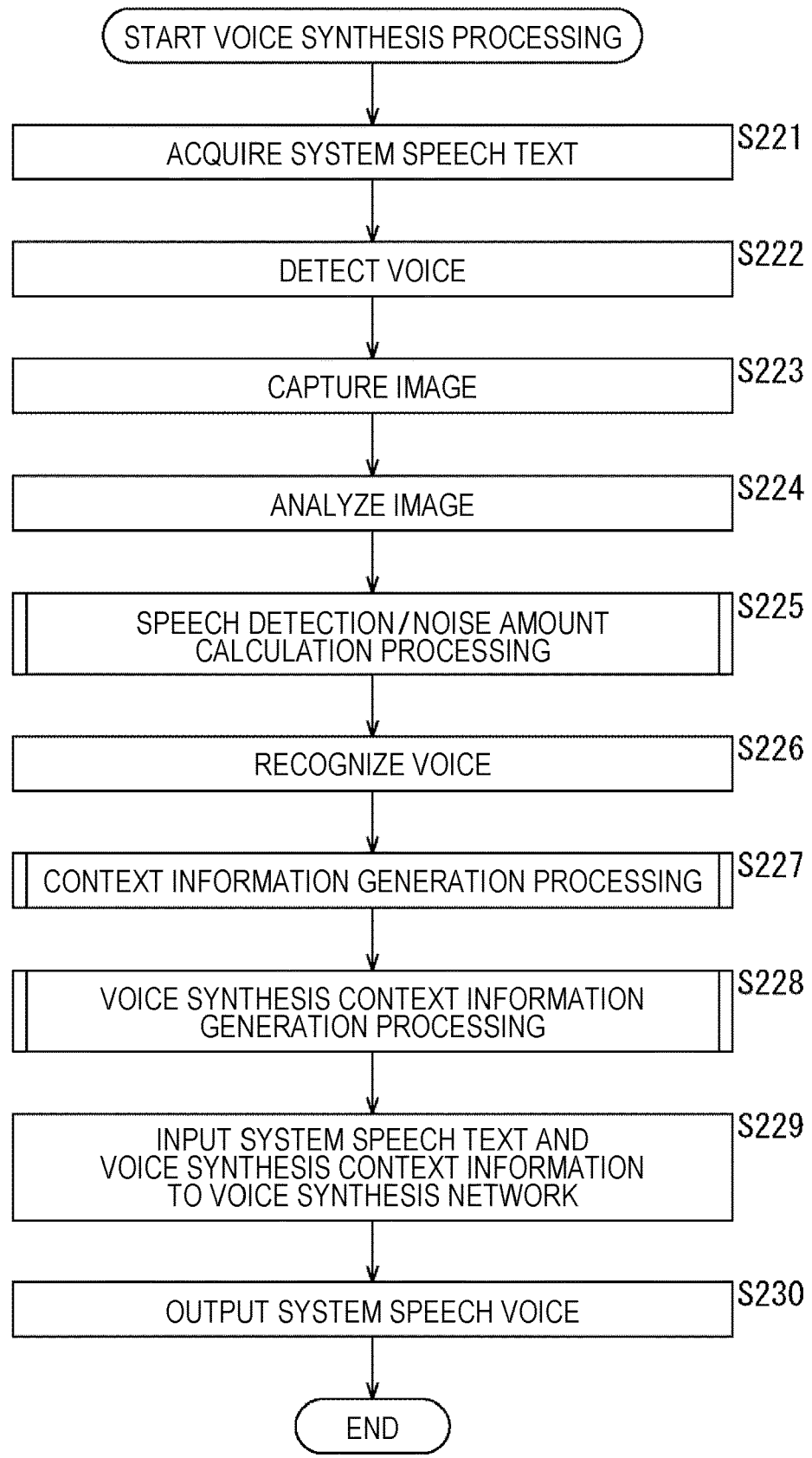
FIG. 28 is a flowchart for describing the voice synthesis processing of the voice synthesis device.

Voice synthesis processing of the voice synthesis device 2 having the above-described configuration will be described with reference to a flowchart of FIG. 28.

At step S221, the system speech text acquisition unit 59 acquires the system speech text.

At step S222, the voice input device 53 detects the voice.

At step S223, the sensor device 51 performs imaging.

At step S224, the image recognition unit 52 analyzes the captured image to detect the face of the user on the image and identify the user. Moreover, the image recognition unit 52 estimates the emotion of the user. The direction information and the individual identification information regarding each user are supplied to the voice signal processing unit 54, and the direction information, the individual identification information, and the emotion information regarding each user are supplied to the context estimation unit 56.

At step S225, the voice signal processing unit 54 performs the speech detection/noise amount calculation processing. The signal of the speech voice obtained by the speech detection/noise amount calculation processing is supplied to the voice recognition unit 55, and the information indicating the noise amount and the user speech direction is supplied to the context estimation unit 56.

At step S226, the voice recognition unit 55 performs voice recognition for the voice signal supplied from the voice signal processing unit 54, and generates the user speech text. The user speech text is supplied to the context estimation unit 56.

At step S227, the context estimation unit 56 performs the context information generation processing. The context information generated by the context information generation processing is supplied to the voice synthesis control unit 57.

At step S228, the voice synthesis control unit 57 performs voice synthesis context information generation processing. Details of the voice synthesis context information generation processing will be described later with reference to a flowchart of FIG. 29.

At step S229, the voice synthesis control unit 57 inputs, to the voice synthesis network, the voice synthesis context information together with the system speech text output from the system speech text acquisition unit 59. The system speech voice waveform data is output from the voice synthesis network.

At step S230, the voice reproduction device 62 reproduces the system speech voice waveform data output from the voice synthesis network, and outputs the system speech voice. Thereafter, the processing ends.

The above-described processing is, for example, performed in every timing of making the system speech.

Voice Synthesis Context Information Generation Processing

Next, the voice synthesis context information generation processing performed at step S228 of FIG. 28 will be described with reference to a flowchart of FIG. 29.

Figure 15:
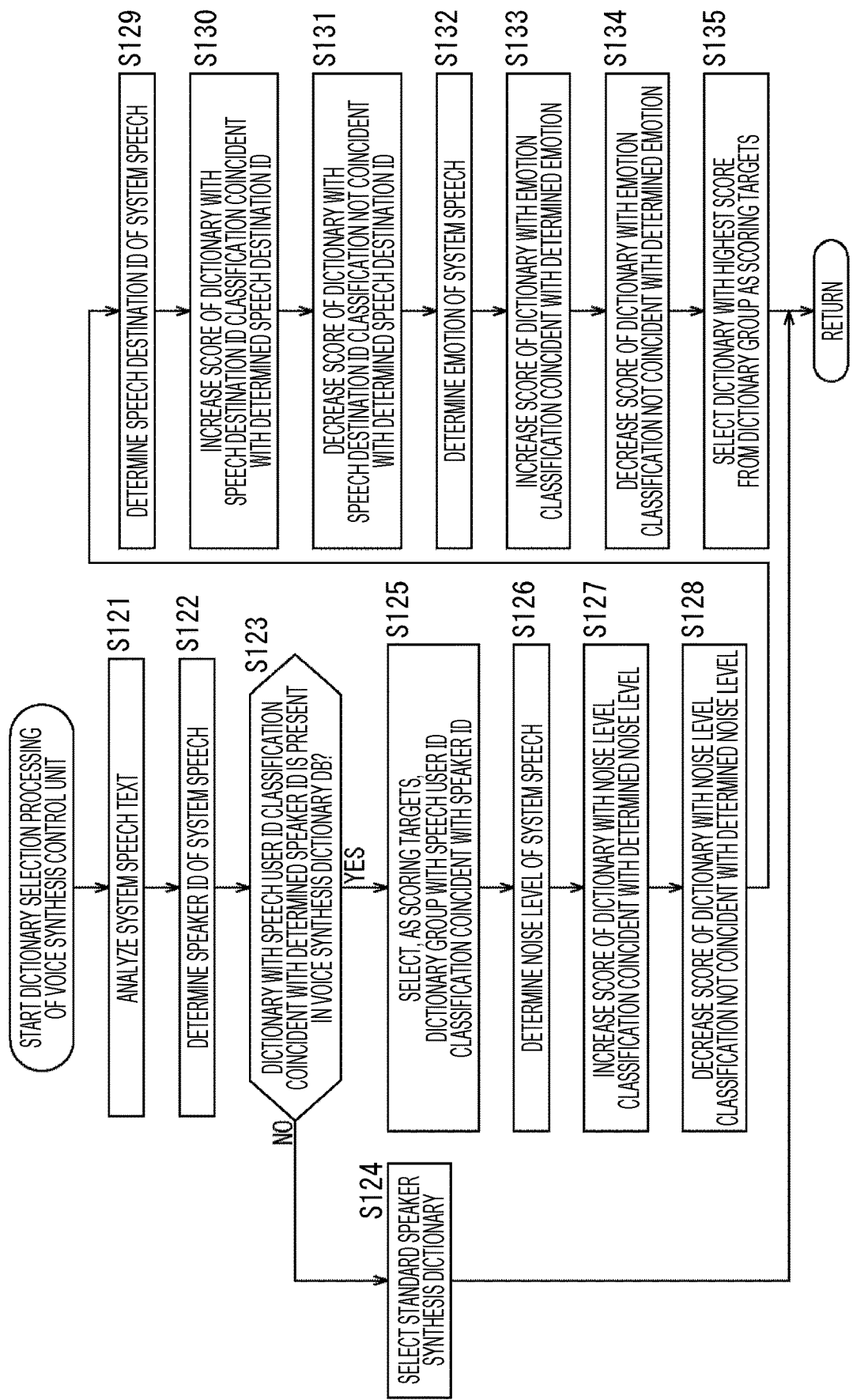
FIG. 15 is a flowchart for describing dictionary selection processing performed at step S108 of FIG. 14.
Figure 29:
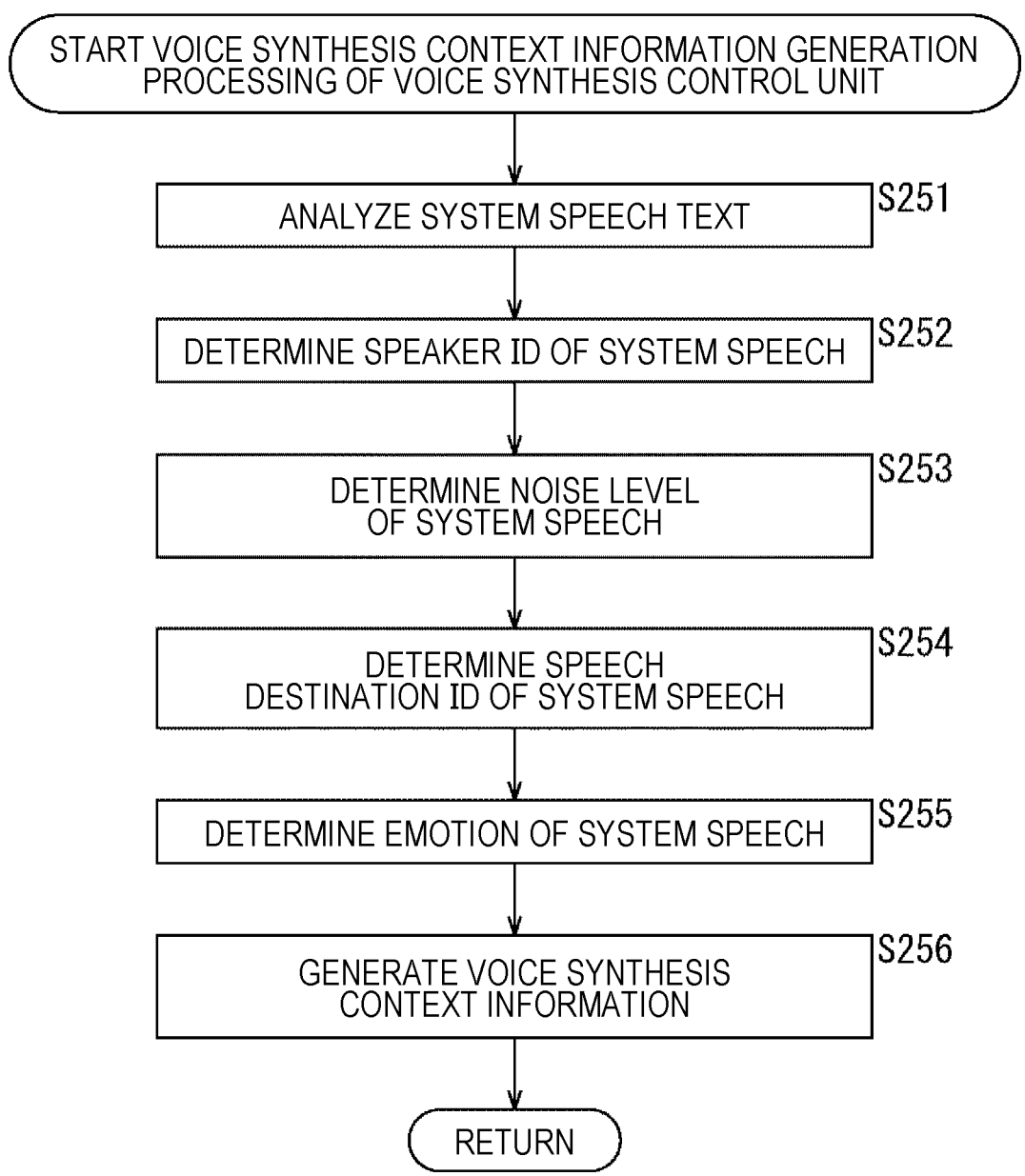
FIG. 29 is a flowchart for describing voice synthesis context information generation processing performed at a step S228 of FIG. 28.

Processing of steps S251 to S255 illustrated in FIG. 29 is processing similar to the processing of steps S121, S122, S126, S129, S132 of FIG. 15.

At step S251, the voice synthesis control unit 57 performs the natural language processing and the semantic analysis processing, and analyzes the system speech text.

At step S252, the voice synthesis control unit 57 determines the speaker ID to be used for the system speech by means of the contents of the context information, the contents of the system speech text, and the user relationship data.

At step S253, the voice synthesis control unit 57 determines the noise level of the system speech on the basis of the context information.

At step S254, the voice synthesis control unit 57 determines the speech destination ID of the system speech on the basis of, e.g., the contents of the system speech text and the statuses.

At step S255, the voice synthesis control unit 57 determines the emotion of the system speech on the basis of the contents of the system speech text.

At step S256, the voice synthesis control unit 57 generates and outputs the voice synthesis context information including the information indicating the speaker ID, the noise level, the speech destination ID, and the emotion determined by the above-described processing. Thereafter, the processing returns to step S228 of FIG. 28, and the above-described processing is repeated.

As described above, even in the case of using the voice synthesis network as the voice synthesis data, user's attention to the system speech and the depth of user's understanding of the system speech can be improved. Moreover, more system speech variations according to user's individual statuses can be provided.

Note that in the case of using the voice synthesis network as the voice synthesis data, the functions of the learning device 1 and the functions of the voice synthesis device 2 can be also implemented in a single agent device.

Second Variation

The case where the learning device 1, the voice synthesis device 2, and the agent device 151 are used at home has been described, but these devices can be used under various types of environment where the same user is present upon learning and voice synthesis. For example, these devices may be used in a working place, a classroom of a school, a store such as a restaurant, a public facility, a private automobile, and a train, for example.

Moreover, it has been described that the degree of acceptance of a certain user for a request or instruction of another user is specified as the relationship between the users, but various relationships between persons may be specified and used for determination on, e.g., the speaker. For example, a relationship of a physique recognized from the image, a relationship of a gender, and a relationship of a job title recognized from the user information can be used for determination on, e.g., the speaker.

Configuration Example of Computer

A series of processing described above can be executed by hardware, or can be executed by software. In the case of executing a series of processing by the software, a program forming the software is installed into, e.g., a computer incorporated into dedicated hardware or a versatile personal computer from a program storage medium.

Figure 30:
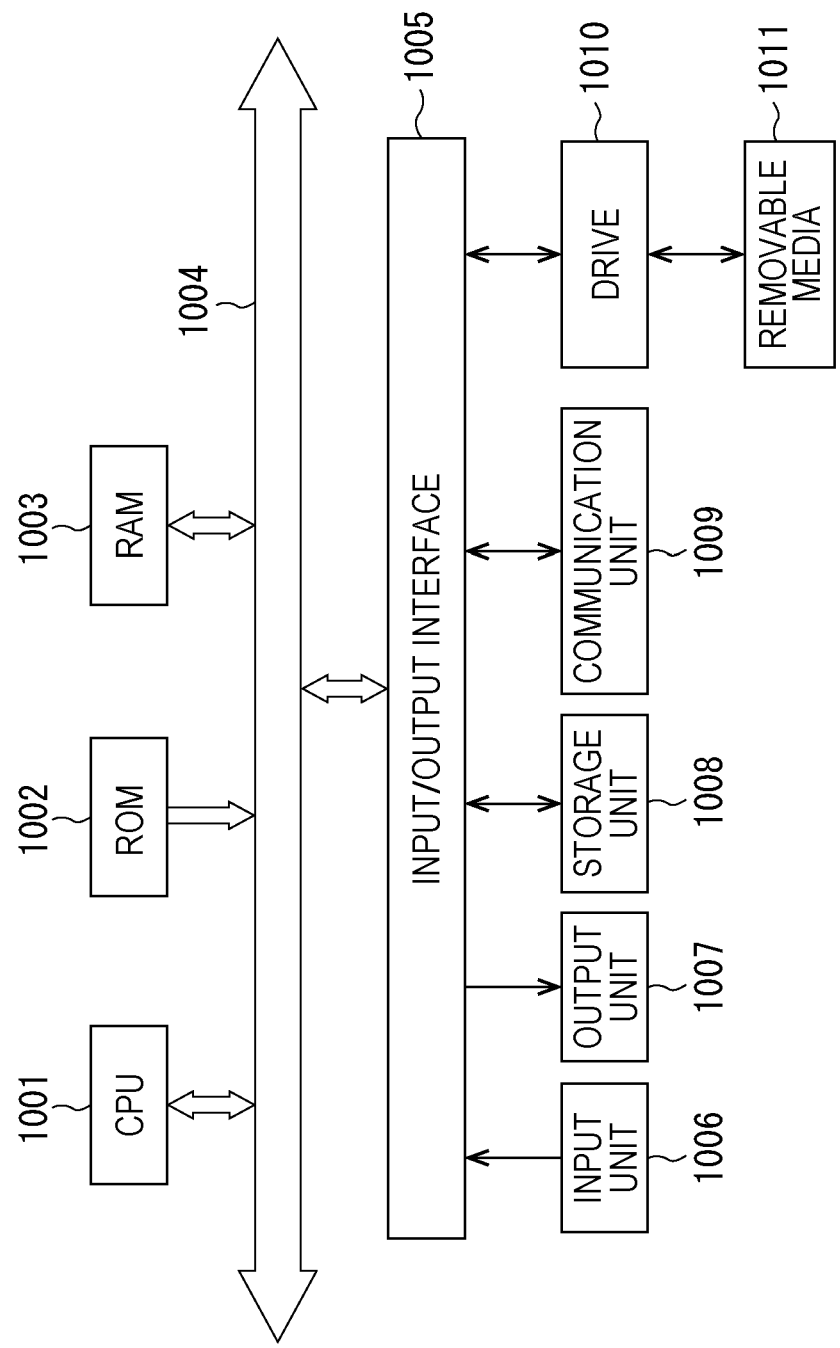
FIG. 30 is a block diagram of a configuration example of a computer.

FIG. 30 is a block diagram of a configuration example of the hardware of the computer executing a series of processing described above by the program.

A central processing unit (CPU) 1001, a read only memory (ROM) 1002, and a random access memory (RAM) 1003 are connected to each other via a bus 1004.

An input/output interface 1005 is further connected to the bus 1004. An input unit 1006 including, e.g., a keyboard and a mouse and an output unit 1007 including, e.g., a display and a speaker are connected to the input/output interface 1005. Moreover, a storage unit 1008 including, e.g., a hard drive and a non-volatile memory, a communication unit 1009 including, e.g., a network interface, and a drive 1010 configured to drive removable media 1011 are connected to the input/output interface 1005.

In the computer configured as described above, the CPU 1001 loads and executes, for example, a program stored in the storage unit 1008 in the RAM 1003 via the input/output interface 1005 and the bus 1004, thereby performing a series of processing described above.

The program executed by the CPU 1001 is, for example, recorded in the removable media 1011 or is provided via a wired or wireless transfer medium such as a local area network, the Internet, or digital broadcasting, and then, is installed into the storage unit 1008.

Note that the program executed by the computer may be a program for performing the processing in chronological order described in the present specification or a program for performing the processing in parallel or performing the processing at necessary timing such as invocation timing.

Note that in the present specification, the system means a group of a plurality of components (devices, modules (parts), etc.) regardless of whether or not all components are in the same housing. Thus, both of a plurality of devices housed in separate housings and connected to each other via a network and a single device configured such that a plurality of modules are housed in a single housing are systems.

Note that the advantageous effects described in the present specification have been set forth merely as examples, and are not limited. Other advantageous effects may be provided.

The embodiments of the present technology are not limited to those described above, and various changes can be made without departing from the gist of the present technology.

For example, the present technology can have a cloud computing configuration for processing a single function by a plurality of devices via a network in cooperation.

Moreover, each step described in the above-described flowcharts can be executed by a single device, and can be also executed by a plurality of devices in cooperation.

Further, in a case where a single step includes a plurality of types of processing, these plurality of types of processing included in the single step can be executed by a single device, and can be also executed by a plurality of devices in cooperation.

Configuration Combination Examples

The present technology may have the following configurations.

(1) A learning device including:

a voice recognition unit configured to perform voice recognition of speech voice of a plurality of users;

an estimation unit configured to estimate statuses when a speech is made; and a learning unit configured to learn, on the basis of data of the speech voice, a result of the voice recognition, and the statuses when the speech is made, voice synthesis data to be used for generation of synthesized voice according to statuses upon voice synthesis.

(2) The learning device according to (1), in which the estimation unit generates, on the basis of the voice recognition result, relationship data indicating a relationship between a speech user and a speech destination user included in the plurality of users.

(3) The learning device according to (2), further including:

an image recognition unit configured to analyze a captured image to recognize a face on the image; and a voice signal processing unit configured to detect a sound source direction on the basis of a voice signal detected when the speech is made, the estimation unit specifying the speech user on the basis of the sound source direction and the direction of the face on the image.

(4) The learning device according to (3), in which the estimation unit specifies, as the speech destination user, a user making a speech subsequently to a speech made by the speech user.

(5) The learning device according to (3) or (4), in which the voice signal processing unit extracts, as a noise component, components of other directions than the sound source direction of speech voice of the speech user from the voice signal.

(6) The learning device according to (5), in which the image recognition unit recognizes the emotion of the speech user whose face is on the image.

(7) The learning device according to (6), in which the estimation unit estimates, as the statuses when the speech is made, the emotion of the speech user and a noise level.

(8) The learning device according to any one of (1) to (7), in which the learning unit generates, as the voice synthesis data, dictionary data obtained in such a manner that each of the speech voice data and the voice recognition result is classified according to the statuses when the speech is made.

(9) The learning device according to any one of (1) to (7), in which the learning unit generates, as the voice synthesis data, a neural network taking information regarding each of the voice recognition result and the statuses when the speech is made as input and taking the speech voice data as output.

(10) A learning method including the steps of:
performing voice recognition of speech voice of a plurality of users;
estimating statuses when a speech is made; and
learning, on the basis of data of the speech voice, a result of the voice recognition, and the statuses when the speech is made, voice synthesis data to be used for generation of synthesized voice according to statuses upon voice synthesis.

(11) A voice synthesis device including:
an estimation unit configured to estimate statuses; and
a generation unit configured to use voice synthesis data generated by learning on the basis of data on speech voice of a plurality of users, a voice recognition result of the speech voice, and statuses when a speech is made to generate synthesized voice indicating the contents of predetermined text data and obtained according to the estimated statuses.

(12) The voice synthesis device according to (11), in which the generation unit generates the synthesized voice taking, as a speaker user, a user according to a speech destination user of the synthesized voice.

(13) The voice synthesis device according to (12), further including
a control unit configured to select a speech user on the basis of relationship data indicating a relationship between the speech user and a speech destination user included in the plurality of users, the relationship data being generated upon learning on the basis of the voice recognition result.

(14) The voice synthesis device according to (13), in which the control unit selects the speech destination user on the basis of the contents of the text data.

(15) The voice synthesis device according to any one of (12) to (14), further including:
an image recognition unit configured to analyze a captured image to recognize a face on the image; and
a voice signal processing unit configured to detect a sound source direction on the basis of a detected voice signal to extract, as a noise component, components of other directions than the sound source direction of speech voice of a predetermined user.

(16) The voice synthesis device according to (15), in which the estimation unit specifies the emotion of the speaker user on the basis of the contents of the text data to estimate the emotion of the speaker user and a noise level as the statuses.

(17) The voice synthesis device according to any one of (11) to (16), in which the voice synthesis data is dictionary data obtained in such a manner that each of the speech voice data and the voice recognition result is classified according to the statuses when the speech is made.

(18) The voice synthesis device according to any one of (11) to (16), in which the voice synthesis data is a neural network taking information regarding each of the voice recognition result and the statuses when the speech is made as input and taking the speech voice data as output.

(19) A voice synthesis method including the steps of:
estimating statuses; and
using voice synthesis data generated by learning on the basis of data on speech voice of a plurality of users, a voice recognition result of the speech voice, and statuses when a speech is made to generate synthesized voice indicating the contents of predetermined text data and obtained according to the estimated statuses.

REFERENCE SIGNS LIST

1 Learning device
2 Voice synthesis device
11 Sensor device
12 Image recognition unit
13 Voice input device
14 Voice signal processing unit
15 Voice recognition unit
16 Context estimation unit
17 Learning data storage unit
18 Relationship data storage unit
19 Voice synthesis dictionary learning unit
20 Voice synthesis data storage unit
51 Sensor device
52 Image recognition unit
53 Voice input device
54 Voice signal processing unit
55 Voice recognition unit
56 Context estimation unit
57 Voice synthesis control unit
58 Relationship data storage unit
59 System speech text acquisition unit
60 Voice synthesis data storage unit
61 Voice synthesis unit
62 Voice reproduction device

The invention claimed is:
1. A learning device comprising:
a voice recognition unit configured to perform voice recognition of speech voice of a plurality of users;
an estimation unit configured to estimate a status when a speech is made by a speech user among the plurality of users; and
a learning unit configured to learn, on a basis of data of the speech voice, a result of the voice recognition, and the estimated status when the speech is made, voice synthesis data to be used for generation of synthesized voice according to the estimated status upon voice synthesis,
wherein the estimated status is based on context information other than content of the speech voice,
wherein the context information includes an identity of the speech user and an identity of a speech destination user included in the plurality of users, and wherein the voice recognition unit, the estimation unit, and the learning unit are each implemented via at least one processor.

2. The learning device according to claim 1, wherein the estimation unit is further configured to generate, on a basis of the voice recognition result, relationship data indicating a relationship between the speech user and the speech destination user included in the plurality of users.

3. The learning device according to claim 2, further comprising:
an image recognition unit configured to analyze a captured image to recognize a face on the captured image; and
a voice signal processing unit configured to detect a sound source direction on a basis of a voice signal detected when the speech is made,
wherein the estimation unit is further configured to specify the speech user on a basis of the sound source direction and a direction of the face on the captured image, and
wherein the image recognition unit and the voice signal processing unit are each implemented via at least one processor.

4. The learning device according to claim 3, wherein the estimation unit is further configured to specify, as the speech destination user, a user making a speech subsequently to a speech made by the speech user.

5. The learning device according to claim 3, wherein the voice signal processing unit is further configured to extract, as a noise component, components of other directions than the sound source direction of speech voice of the speech user from the voice signal.

6. The learning device according to claim 5, wherein the image recognition unit is further configured to recognize an emotion of the speech user whose face is on the captured image.

7. The learning device according to claim 6, wherein the estimation unit estimates, as the status when the speech is made, the emotion of the speech user and a noise level.

8. The learning device according to claim 1, wherein the learning unit is further configured to generate, as the voice synthesis data, dictionary data obtained in such a manner that each of the speech voice data and the voice recognition result is classified according to the status when the speech is made.

9. The learning device according to claim 1, wherein the learning unit is further configured to generate, as the voice synthesis data, a neural network taking information regarding each of the voice recognition result and the status when the speech is made as input and taking the speech voice data as output.

10. A learning method comprising:
performing voice recognition of speech voice of a plurality of users;
estimating a status when a speech is made by a speech user among the plurality of users; and
learning, on a basis of data of the speech voice, a result of the voice recognition, and the estimated status when the speech is made, voice synthesis data to be used for generation of synthesized voice according to the estimated status upon voice synthesis,
wherein the estimated status is based on context information other than content of the speech voice, and
wherein the context information includes an identity of the speech user and an identity of a speech destination user included in the plurality of users.

11. A voice synthesis device comprising:
an estimation unit configured to estimate a status; and
a generation unit configured to use voice synthesis data generated by learning on a basis of data on speech voice of a plurality of users, a voice recognition result of the speech voice, and the estimated status when a speech is made by a speech user among the plurality of users to generate synthesized voice indicating a content of predetermined text data and obtained according to the estimated status,
wherein the estimated status is based on context information other than content of the speech voice,
wherein the context information includes an identity of the speech user and an identity of a speech destination user included in the plurality of users, and
wherein the estimation unit and the generation unit are each implemented via at least one processor.

12. The voice synthesis device according to claim 11, wherein
the generation unit is further configured to generate the synthesized voice taking, as a speaker user for the synthesized voice, a user determined according to the identity of the speech destination user of the synthesized voice.

13. The voice synthesis device according to claim 12, further comprising:
a control unit configured to select a speech user on a basis of relationship data indicating a relationship between the speech user and the speech destination user included in the plurality of users, the relationship data being generated upon learning on a basis of the voice recognition result,
wherein the control unit is implemented via at least one processor.

14. The voice synthesis device according to claim 13, wherein
the control unit selects the speech destination user on a basis of the content of the text data.

15. The voice synthesis device according to claim 12, further comprising:
an image recognition unit configured to analyze a captured image to recognize a face on the captured image; and
a voice signal processing unit configured to detect a sound source direction on a basis of a detected voice signal to extract, as a noise component, components of other directions than the sound source direction of speech voice of a predetermined user,
wherein the image recognition unit and the voice signal processing unit are each implemented via at least one processor.

16. The voice synthesis device according to claim 15, wherein
the estimation unit is further configured to specify an emotion of the speaker user on a basis of the content of the text data to estimate the emotion of the speaker user and a noise level as the status.

17. The voice synthesis device according to claim 11, wherein
the voice synthesis data is dictionary data obtained in such a manner that each of the speech voice data and the voice recognition result is classified according to the estimated status when the speech is made.

18. The voice synthesis device according to claim 11, wherein the voice synthesis data is a neural network taking information regarding each of the voice recognition result and the estimated status when the speech is made as input and taking the speech voice data as output.

19. A voice synthesis method comprising:

estimating a status; and using voice synthesis data generated by learning on a basis of data on speech voice of a plurality of users, a voice recognition result of the speech voice, and the estimated status when a speech is made by a speech user among the plurality of users to generate synthesized voice indicating a content of predetermined text data and obtained according to the estimated status, wherein the estimated status is based on context information other than content of the speech voice, and wherein the context information includes an identity of the speech user and an identity of a speech destination user included in the plurality of users.

20. The learning device according to claim 8, wherein the learning unit generates the dictionary data as the voice synthesis data based on the identity of the speech user and the identity of the speech destination user.

* * * * *